(12) United States Patent
Ishizu et al.

(10) Patent No.: US 8,477,721 B2
(45) Date of Patent: Jul. 2, 2013

(54) WIRELESS COMMUNICATION TERMINAL AND WIRELESS COMMUNICATION SYSTEM

(75) Inventors: Kentaro Ishizu, Tokyo (JP); Homare Murakami, Tokyo (JP); Goh Miyamoto, Tokyo (JP); Ha Nguyen Tran, Tokyo (JP); Stanislav Filin, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 860 days.

(21) Appl. No.: 12/566,508

(22) Filed: Sep. 24, 2009

(65) Prior Publication Data

US 2010/0246529 A1 Sep. 30, 2010

(30) Foreign Application Priority Data

Sep. 24, 2008 (JP) ................................ 2008-244948

(51) Int. Cl.
*H04W 4/00* (2009.01)
(52) U.S. Cl.
USPC ......................................... 370/331; 370/332
(58) Field of Classification Search
None
See application file for complete search history.

(56) References Cited

U.S. PATENT DOCUMENTS

| | | | | |
|---|---|---|---|---|
| 8,019,335 | B2* | 9/2011 | Kallio | 455/426.1 |
| 2006/0209758 | A1* | 9/2006 | Qiang et al. | 370/331 |
| 2007/0091864 | A1* | 4/2007 | Honjo et al. | 370/338 |
| 2008/0198811 | A1* | 8/2008 | Deshpande et al. | 370/332 |
| 2008/0287119 | A1* | 11/2008 | Yasuda | 455/425 |
| 2009/0011757 | A1* | 1/2009 | Tenny | 455/425 |

FOREIGN PATENT DOCUMENTS

JP 2008-148136 6/2008

OTHER PUBLICATIONS

G. Wu, P. Havinga and M. Mizuno, "MIRAI Architecture for Heterogeneous Networks", IEEE Communications Magazine, pp. 126-134, 2002.

M. Inoue, K. Mahmud, H. Murakami, M. Hasegawa and H. Morikawa, "Novel Out-of-Band Signaling for Seamless Interworking between Heterogeneous Networks", IEEE Wireless Communication, vol. 11, No. 2, pp. 56-63, 2004.

H. Harada, "Software Defined Radio Prototype toward Cognitive Radio Communication Systems", IEEE Dyspan 2005, vol. 1, pp. 539-547, 2005.

Homepage http://www.iana.org/assignments/port-numbers, 230 pgs.

(Continued)

*Primary Examiner* — Ian N Moore
*Assistant Examiner* — Brian T Le
(74) *Attorney, Agent, or Firm* — Sampson & Associates, P.C.

(57) ABSTRACT

To reduce power consumption for scanning and maintain communication quality by reducing the time for scanning or connection when a wireless communication terminal switches between networks or base stations. A wireless communication terminal 1 enabling connection with a plurality of base stations disposed in different positions which includes a base station scanning unit 100 detecting and scanning a base station capable of communication at the current position of the wireless communication terminal, a simultaneous detection base station recording unit 101 recording simultaneously detected base stations as simultaneous detection information in a storage unit, a connection candidate extraction unit 102 and a first communication unit 103 performing communication by connection with the extracted connection candidate base station. Based on the simultaneous detection information, the connection candidate extraction unit 102 extracts a base station having the possibility of simultaneous detection with the currently connected base station as a connection candidate base station.

17 Claims, 14 Drawing Sheets

OTHER PUBLICATIONS

"Amendment to Carrier Sense Multiple Access with Collision Detection (CSMA/CD) Access Method and Physical Layer Specifications—Aggregation of Multiple Link Segments", IEEE 802.3ad 2000, Mar. 30, 2000, 183 pgs.

Kentaro Ishizu, Hiroshi Harada, Shuzo Kato, "A Study on Coordination of Link Aggregation Technologies for Different Layers on Cognitive Wireless Clouds", IEICE Technical Report, vol. 107, No. 314, The Institute of Electronics, Information and Communication Engineers, Nov. 8, 2007, 6 pgs.

Kentaro Ishizu, Homare Murakami, Goh Miyamoto, Ha Ngyuen Tran, Stanislav Filin, Hiroshi Harada, "Fast Scanning of Wireless Access Channels using Detection Probability of Access Points in Cognitive Wireless Networks", IEICE Technical Report, Oct. 2008, 8 pgs.

* cited by examiner

Pij: PROBABILITY OF SIMULTANEOUS DETECTION OF BASE STATION APj WHEN WIRELESS COMMUNICATION TERMINAL IS CONNECTED TO APi

*FIG. 6*

| i \ j | 0 ··· |
|---|---|
| 0 | 00, 99, 98, 14, 14, 22, 51, 93, 22, 00, 00, 00, 00, 00 |
| ⋮ | 99, 00, 98, 14, 14, 22, 50, 93, 22, 00, 00, 00, 00, 00 |
|  | 99, 99, 00, 14, 14, 22, 51, 92, 22, 00, 00, 00, 00, 00 |
|  | 99, 99, 99, 00, 99, 99, 99, 99, 00, 00, 00, 00, 00, 00 |
|  | 99, 99, 99, 99, 00, 99, 99, 99, 00, 00, 00, 00, 00, 00 |
|  | 97, 99, 97, 65, 65, 00, 97, 99, 00, 00, 00, 00, 00, 00 |
|  | 99, 99, 99, 29, 29, 43, 00, 99, 00, 00, 00, 00, 00, 00 |
|  | 98, 98, 96, 15, 15, 23, 53, 00, 16, 01, 01, 00, 00, 00 |
|  | 99, 99, 99, 00, 00, 00, 00, 69, 00, 00, 00, 00, 00, 00 |
|  | 08, 00, 17, 00, 00, 00, 00, 21, 00, 00, 99, 86, 95, 97 |
|  | 08, 00, 17, 00, 00, 00, 00, 21, 00, 99, 00, 86, 95, 97 |
|  | 10, 00, 20, 00, 00, 00, 00, 10, 00, 99, 99, 00, 95, 90 |
|  | 04, 00, 18, 00, 00, 00, 00, 18, 00, 99, 99, 86, 00, 95 |

(a)

(b)

WIRELESS COMMUNICATION TERMINAL AND WIRELESS COMMUNICATION SYSTEM

RELATED APPLICATIONS

This application claims priority to Japanese Application 2008-244948 filed on Sep. 24, 2008, the contents of which are incorporated herein by reference in their entirety for all purposes.

TECHNICAL FIELD

The present invention relates to a wireless communication terminal and a system for the same performing wireless communication by switching a connection-destination base station and, in particular, relates to a technique for facilitating and optimizing selection by a wireless communication terminal of the base station for connection after the currently connected base station.

BACKGROUND ART

Broad-based research is continuing into the creation of a network such as an internet and a ubiquitous network capable of communication at all times and from all places.

The present applicant has carried out research into techniques of seamless handover between heterogeneous wireless networks (Non Patent Literature 1 and 2) and research into software wireless techniques enabling connection with heterogeneous wireless interfaces to switch the wireless systems (Non Patent Literature 3).

Currently since mobile communication terminals such as personal digital assistants (PDA), mobile phones or small laptop computers are provided with a plurality of wireless communication methods, a user can perform wireless communication by switching and selecting an optimal system from the plurality of systems or can increase the communication speed by using more than one method at the same time.

On the most practical level, it is often the case that different data communication devices must be used depending on the respective methods or wireless network providers.

For example, it is sometimes the case that one wireless network provider provides a data communication device using a USB interface and another network provider provides a data communication device using a PCMCIA interface.

When switching between heterogeneous types of wireless communication networks, even when using the same type of wireless network, naturally a relatively long period of time is required to scan the network of different channels and execute a connection.

That is to say, in contrast to wireless communication networks such as those for mobile telephones in which base stations are arranged in a planned manner, networks such as wireless LANs in which all base station positions are not always identified require scanning by a communication terminal to enable switching communication to other networks and channels.

However when a communication terminal moves between base stations, the scanning of the connection-destination network or connection processing may not be performed in a timely manner resulting in the problem that the connection is cut off or communication quality is adversely affected.

Furthermore when scanning all networks or channels enabling communication in a communication terminal, the battery residual charge is reduced by the consumption of a large amount of power thereby adversely affecting the speed of other process due to the scanning process.

Patent Literature 1 discloses a technique which is a conventional patent technique related to the above problem. This technique has the object of avoiding unnecessary scanning operations when there is no prospect of detecting a base station enabling communication and thereby enabling extension of the usable life of a battery by reducing power consumption.

As a result, when an access point enabling communication cannot be detected, in the event that there is no change in the access points detected by the current scan from the scan on an immediately previous occasion and the fluctuation in reception signal intensities from the detected access points are all within a permissible range, it is determined that the local terminal STA1 is in a state of standstill.

In this case, only the access point with the highest reception signal intensity is set as the tracking target and during a subsequent interval, scanning is only performed with respect to the wireless channel for the unique access point set as the tracking target.

Although this method prevents unnecessary scanning operations when the local terminal is in standstill, it cannot be adapted when the terminal is migrating and furthermore entails the problem that reception signal intensity must be constantly measured.

SUMMARY OF INVENTION

Technical Problem

The present invention is proposed to solve the above problems in the previous techniques and has the object of maintaining communication quality by reducing the time for scanning or connection when a wireless communication terminal switches between a network or a base station and furthermore of reducing the power consumption required for scanning.

Solution to Problem

The invention is related to a wireless communication terminal enabling connection with a plurality of base stations disposed in different positions. The wireless communication terminal includes a base station scanning unit detecting and scanning a base station capable of communication at a current position, a simultaneous detection base station recording unit recording simultaneously detected base stations as simultaneous detection information in a storage unit, a connection candidate extraction unit, and a first communication unit performing communication by connection with the extracted connection candidate base station.

The connection candidate extraction unit based on the simultaneous detection information to extract a base station as a connection candidate base station, the base station having a possibility of detection simultaneous with a connected base station which is currently connected.

The present invention is such that the simultaneous detection base station recording unit records a plurality of simultaneously detected base stations as simultaneous detection information. The connection candidate extraction unit is based on the simultaneous detection information to extract connection candidate base stations, the candidate base stations being at least either a connected base station which is currently connected or a detected base station which is currently detected, and a base station having a possibility of simultaneous detection. As a result, the first communication unit performs communication by connection with an extracted connection candidate base station.

The present invention is provided with a base station detection unit performing detection only of a connection candidate base station, and the first communication unit performs communication by connection with a connection candidate base station detected by the base station detection unit.

The present invention is such that the connection candidate extraction unit includes a calculation processing unit and a connection candidate selection unit. The calculation processing unit is based on the simultaneous detection information to calculate a probability that the connected base station or the detected base station will be simultaneously detected. The probability is calculated as a simultaneous detection probability for each connection candidate base station. The connection candidate selection unit selects a connection candidate base station for which the simultaneous detection probability satisfies a predetermined condition. The first communication unit performs communication by connection with the selected connection candidate base station.

The present invention is such that the simultaneous detection probability is a value calculated using the simultaneous detection information to tally the frequency of simultaneous detection of the connected base station or the detected base station, together with the connection candidate base station, and then dividing that frequency by the detection frequency for the connected base station or the detected base station.

The present invention is such that the simultaneous detection base station recording unit records simultaneous detection information including a predetermined communication parameter value related to a base station together with the simultaneously detected base station.

This configuration is provided with a calculation processing unit and a connection candidate selection unit. The calculation processing unit calculates a probability of detecting the connection candidate base station simultaneously with the connected base station or the detected base station. The probability is calculated as a simultaneous detection probability by a predetermined calculation using the communication parameter value. The connection candidate selection unit selects a connection candidate base station for which the simultaneous detection probability satisfies a predetermined condition. The first communication unit performs communication by connection with the selected connection candidate base station.

In addition to radio-wave intensity, the communication parameter can use a reception packet error rate when performing communication with the base station or a communication delay time.

The communication parameter need not use a value resulting from measurements performed by a measurement device and the communication parameter may be a value obtained by applying a predetermined calculation process to a measurement result.

The present invention is such that the communication parameter value uses radio-wave intensity with each base station and the radio-wave intensity of simultaneously detected base stations is accumulated and stored in the simultaneous detection information. The radio-wave intensity, for example, has a maximum value of 1 and may take actual values in a range from 0 to 1.

The method of calculating the simultaneous detection probability is characterized in using a value calculated by dividing the cumulative value for the simultaneous detection of the connected base station or the detected base station, together with the connection candidate base station, and then dividing that frequency by the detection frequency for the connected base station or the detected base station.

The present invention wherein the simultaneous detection base station recording unit records simultaneous detection information including not only a simultaneously detected base station together with positive information for extraction as a connection candidate base station when that base station is detected, but also records negative information for exclusion from the connection candidate base stations.

In addition to a cumulative value for radio-wave intensity or the frequency of simultaneous detection, positive information includes information such as when a rate at which base stations are simultaneously detected, a cumulative value for radio-wave intensity or an average value exceeds a predetermined threshold value or information such as when a packet error rate, a cumulative value for communication delay time or an average value is less than a predetermined threshold value.

Negative information includes information such as when a rate at which base stations are simultaneously detected, a cumulative value for radio-wave intensity or an average value is less than a predetermined threshold value or information such as when a packet error rate, a cumulative value for communication delay time or an average value exceeds a predetermined threshold value.

The negative information may be used in the calculation of the simultaneous detection probability or may be used in a process of excluding a base station when a base station having negative information is included in connection candidate base stations.

The present invention can be provided with a communication condition detection unit detecting a communication condition in the first communication unit, and a scanning execution command unit which, in response to the detection results, commands the base station scanning unit to scan for a base station capable of communication when the communication conditions satisfy predetermined conditions.

The present invention relates to a wireless communication system including a wireless communication terminal enabling connection with a plurality of base stations disposed in different positions and a connection management server presenting a connection candidate base station for connection after the currently connected base station to the wireless communication terminal.

The wireless communication terminal includes a base station scanning unit detecting and scanning a base station capable of communication at the current position of the wireless communication terminal, a second terminal communication unit sending the simultaneously detected base stations to the connection management server as simultaneous detection information and receiving information with respect to the connection candidate base stations from the connection management server, and a first communication unit performing communication by connection with the connection candidate base station.

The connection management server includes a second server communication unit receiving the simultaneous detection information sent from the wireless communication terminal and sending the information regarding a connection candidate base station to the wireless communication terminal, a storage unit recording the simultaneous detection information, and a connection candidate extraction unit using the simultaneous detection information to extract a base station having the possibility of detection simultaneous with the connected base station which is currently connected as a connection candidate base station.

According to the present invention, the second terminal communication units sends a plurality of simultaneously detected base stations as simultaneous detection information, and the connection candidate extraction unit is based on the simultaneous detection information to extract connection candidate base stations, the candidate base stations being at least either a connected base station which is currently connected or a detected base station which is currently detected, and a base station having a possibility of simultaneous detection.

The present invention is such that the wireless communication terminal includes a base station detection unit performing detection only of connection candidate base stations, and the first communication unit performs communication by connection with a connection candidate base station detected by the base station detection unit.

The present invention is such that the connection candidate extraction unit in the connection management server includes a calculation processing unit and a connection candidate selection unit. The calculation processing unit is based on the simultaneous detection information to calculate a probability that the connected base station or the detected base station will be simultaneously detected. The probability is calculated as a simultaneous detection probability for each connection candidate base station. The connection candidate selection unit selects a connection candidate base station for which the simultaneous detection probability satisfies predetermined conditions. The second server communication unit sends a selected connection candidate base station to the wireless communication terminal.

In the present invention, the simultaneous detection probability is a value calculated using the simultaneous detection information to tally the frequency of simultaneous detection of the connected base station and the connection candidate base station, and then dividing that frequency by the detection frequency for the connected base station or the detected base station.

The present invention is such that the second terminal communication unit sends simultaneous detection information including a simultaneously detected base station together with a predetermined communication parameter value related to the base station.

The calculation processing unit calculates a probability of simultaneously detecting the connection candidate base station simultaneously with the connected base station or the detected base station. The probability is calculated as a simultaneous detection probability by a predetermined calculation using the communication parameter value. The connection candidate selection unit selects a connection candidate base station for which the simultaneous detection probability satisfies a predetermined condition.

This configuration is characterized in that the first communication unit performs communication by connection with the selected connection candidate base station.

According to the present invention, a radio-wave intensity with each base station is used as a communication parameter value, and the radio-wave intensity of simultaneously detected base stations is accumulated in the simultaneous detection information. The simultaneous detection probability is a value calculated by dividing the cumulative value for the simultaneous detection of the connected base station or the detected base station, together with the connection candidate base station by the detection frequency for the connected base station or the detected base station.

The present invention is such that the simultaneous detection information from the second terminal communication means is recorded and includes not only a plurality of simultaneously detected base stations together with positive information for extraction as a connection candidate base station when that base station is detected, but also includes negative information for exclusion from the connection candidate base stations.

The present invention is such that the wireless communication terminal includes a communication condition detection unit detecting a communication condition in the first communication unit, and a scanning execution command unit which, in response to the detection results, commands the base station scanning unit to scan for a base station capable of communication when the communication conditions satisfy predetermined conditions.

The present invention is such that it provides a wireless communication designated terminal used in the wireless communication system. The terminal includes a second terminal communication unit receiving information for a connection candidate base station from the connection management server, and a first communication unit performing communication by connection with a connection candidate base station. In this manner, although there is not a function of accumulating simultaneous detection information, it is possible to provide a wireless communication designated terminal using information for a connection candidate base station.

The present invention is such that it provides a scanning designated terminal used in the wireless communication system. The terminal includes a base station scanning unit detecting and scanning a base station capable of communication at the current position of the wireless communication terminal, and a second terminal communication unit sending the simultaneously detected base stations to the connection management server as simultaneous detection information. This terminal is different to the wireless communication designated terminal in claim 19 and only accumulates simultaneous detection information and does not perform normal wireless communication.

The present invention has the following effects due to the above configuration.

According to the invention, it is assumed that a base station which has previously been detected simultaneously will often be the subject of simultaneous detection on the present occasion and that base station can perform communication as a connection candidate. Consequently there is no need for unnecessary scanning and a considerable reduction in the time required for scanning and connection is enabled. At the same time, reduction in the power consumption required for scanning is also enabled.

According to the invention, a plurality of base stations can be recorded as simultaneous detection information. In other words, when there are three or more base stations detected at a given location, extraction accuracy can be improved by extracting a connection candidate base station in response to that combination. For example, when there are base stations A, B, C, and D, even when the currently connected base station is A, the optimal base station for subsequent connection will vary in response to the current position within the range of base station A. Thus extraction of the connection candidate base station can be adapted so that when B and C are simultaneously detected, the connection candidate base station is B, when C and D are detected, the connection candidate base station is C and when B, C and D are detected, the connection candidate base station is B.

According to the invention, a reduction in power consumption and a shortening in scanning time are enabled by scanning only those base stations which are designated as connection candidate base stations.

According to the invention, even when a base station has been historically simultaneously detected, use of a simultaneous detection probability enables elimination of a base station which has a low probability from the connection candidates. In this manner, a reduction in power consumption and a shortening in time required for scanning and connection are enabled by not performing unnecessary scanning and connection.

According to the invention, the simultaneous detection base station recording unit does not only records information for simultaneously detected base stations but also records a value of a predetermined communication parameter related to the base stations detected at that time.

The simultaneous detection probability is calculated by a predetermined calculation using the communication parameter value.

In this manner, selection of connection candidates takes into consideration not only the simple fact of whether or not detection is simultaneous but also the level of quality during simultaneous detection.

According to the invention, radio-wave intensity is used as a communication parameter and for example, it is possible to record in the simultaneous detection information in a range of 0-1 using a radio-wave intensity rated to 100% as a value of 1.

Consequently, in contrast to adding a value of 1 for each occurrence of simultaneous detection, in the configuration above which uses a simultaneous detection frequency, the radio-wave intensity is accumulated and a base station with a strong radio-wave intensity is associated with a high simultaneous detection probability and tends to be selected as a connection candidate base station.

In the invention, when the communication parameter is a parameter which has a connection to communication interruption such as a communication delay time or a reception packet error, if the calculation is adapted so that the simultaneous detection probability takes a low value when the parameter is large, there will not be a tendency to select unsuitable base stations as a connection candidate base station.

According to the invention, the simultaneous detection information not only includes information increasing the simultaneous detection probability (positive information), but also can include information which reduces the simultaneous detection probability or information which eliminates a base station from the connection candidate base stations (negative information).

For example, even if a base station has a high simultaneous detection frequency, if connection is performed with a base station which has a high packet error rate, the communication quality will conversely be reduced. Thus flag information is recorded for the purpose of eliminating from the connection candidate base stations those base stations for which the packet error rate is greater than or equal to a predetermined threshold.

According to this type of method, even a base station which has a high simultaneous detection probability or a base station which has strong radio-wave intensity can be eliminated if the base station has poor communication quality and is not suitable for connection. Conversely, when three or more pieces of simultaneous detection information are recorded, information regarding base stations which are unsuitable for connection can be used in the selection of an optimal connection candidate base station.

According to the invention, since the communication state detection unit enables performance of scanning process at a suitable timing, other processing in the communication terminal is not impeded even during acquisition of simultaneous detection information. Consequently leveling of traffic in the wireless communication network and an increase in a processing speed in the communication terminal are enabled.

According to the invention, since a wireless communication terminal and a connection management server are separately provided, there is no need to provide a storage unit for storing simultaneous detection information in the wireless communication terminal or a calculation processing unit for calculating a simultaneous detection probability. Consequently the above advantageous effects are enabled while at the same time reducing the size, reducing the power consumption and reducing the cost of the equipment.

Since accumulated simultaneous detection information is shared between a plurality of wireless communication terminals, selection accuracy is improved with respect to connection candidates.

According to the invention, since a function of accumulating simultaneous detection information is not provided, there is no requirement to provide components for that purpose. Consequently the size, the power consumption and the cost of the equipment can be reduced. Furthermore a wireless communication designated terminal can be provided which enables use of information from the connection management server for connection candidate base stations.

According to the invention, a designated terminal is provided for accumulating simultaneous detection information thereby enabling the accumulation of a large amount of simultaneous detection information. Thus the accuracy of information for connection candidate base stations in the wireless communication system can be improved.

BRIEF DESCRIPTION OF THE DRAWINGS

FIG. 6 is a computational example of the simultaneous detection probability.

DESCRIPTION OF THE PREFERRED EMBODIMENTS

Further aspects of the present invention will be described hereafter making reference to the embodiments depicted in the figures. However the invention is not limited to the aspects below.

Figure 7:
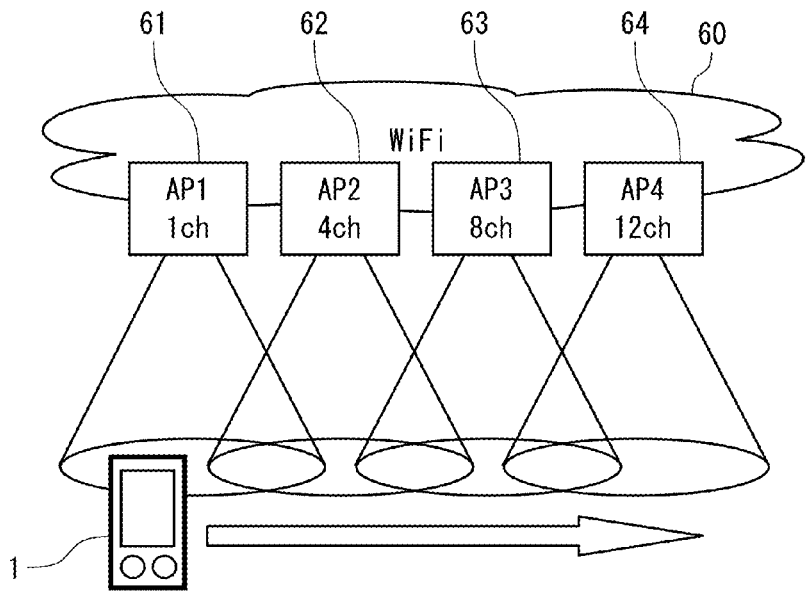
FIG. 7 describes the migration of a wireless communication terminal between a plurality of base stations.
Figure 7:
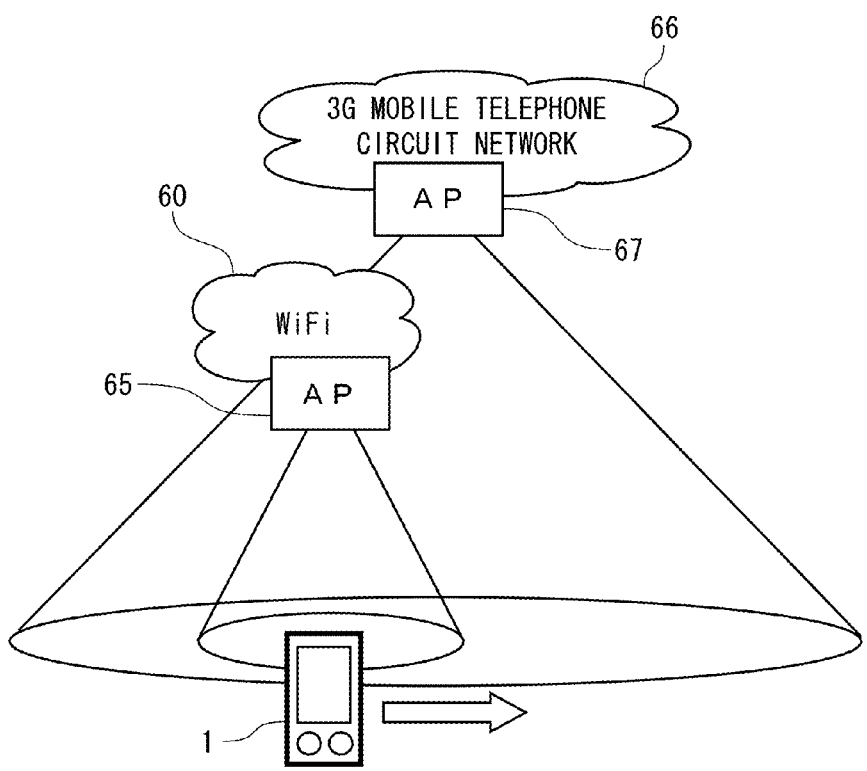

FIG. 7 shows a wireless communication terminal according to the present invention migrating between a plurality of base stations (access points). In FIG. 7(a), the terminal migrates between a plurality of base stations (AP1-AP4) (61-64) in a wireless LAN (WiFi). In FIG. 7(b), a wireless communication terminal currently located in AP(65) of the wireless LAN (60) migrates to AP(67) of a 3G mobile telephone circuit network (66).

In either the same wireless communication network or a heterogeneous wireless communication network, when the wireless communication terminal migrates, the present invention requires switching the connection destination from the base station which is currently connected (61 or 65) to the base station for subsequent connection (62 or 67). Consequently, up to date, the wireless communication terminal has confirmed whether or not connection was possible by scanning the other network, and when the radio-wave intensity from the current base station became weak or when connection was cutoff, the connection with the subsequent base station was established.

However in when using heterogeneous wireless communication networks, considerable time is required to scan after activating another communication module and time is required for scanning a plurality of frequency channels even when using the same wireless communication network. As a result, constant scanning of the next base station was required to avoid interruption to the communication quality due to cutoff of the connection.

On the other hand, since power is consumed by the wireless communication terminal for scanning base stations, constant scanning is not desirable for terminals which often have a limitation on battery capacity due to the usable time or processing capacity. Consequently there is a need to minimize the necessary scanning and rapidly identify an optimal connection destination base station.

Thus the present invention provides a technique in which base stations simultaneously detected by the wireless communication terminal are recorded as simultaneous detection information and that information is used to suggest which base station should be the next connection to the wireless communication terminal. This operation is premised on conditions such as the fact that the base station is generally fixed and there is no variation in the relative positional relationship between the base stations and the fact that the area in which communication is enabled with each base station is approximately fixed. Application of these premises has enabled the identification of connection candidate base stations in the present invention by the wireless communication terminal without a requirement of checking the absolution position of each base station.

Four examples will be described in detail hereafter.

EXAMPLE 1

Configuration of Single Wireless Communication Terminal

Figure 1:
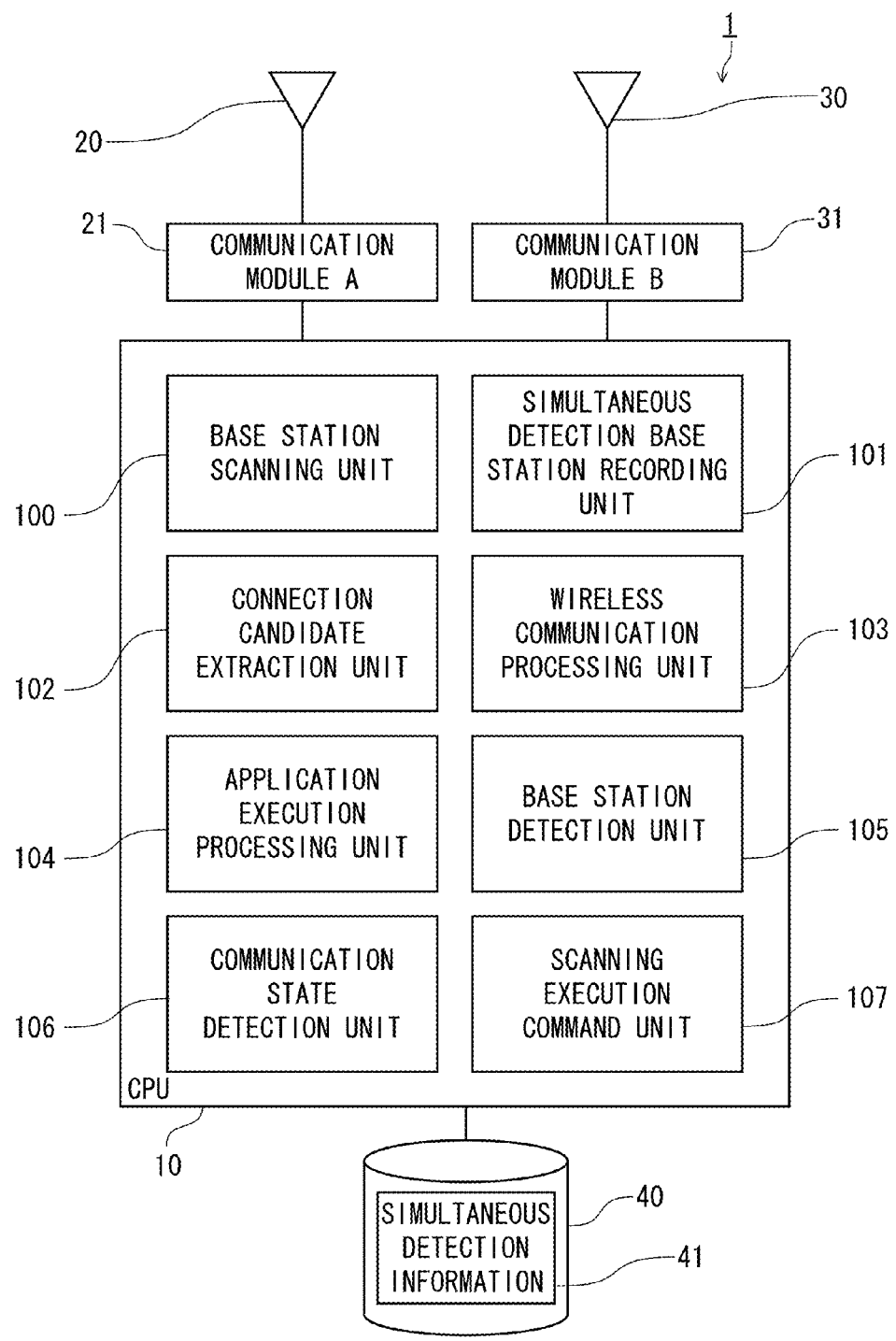
FIG. 1 shows the configuration of a wireless communication terminal according to the present invention

FIG. 1 shows a wireless communication terminal (1) according to the present invention. In addition to a known personal computer, the wireless communication terminal (1) may be realized by any of a mobile telephone terminal, or a mobile communication terminal such as a PDA.

As is well known, in addition to cooperation between a CPU (10) performing computational processing and the like and a memory (not shown), the configuration of this type of terminal is provided with a display device such as a monitor and an input device (not shown) such as a keyboard, mouse or touchpad. Furthermore an external storage device (40) configured by a hard drive or a flash memory, a communication module A(21) and an antenna (20) are provided for communication with a wireless communication network. A plurality of communication modules may be provided for communication with a plurality of wireless communication networks and, as shown in FIG. 1, a communication module B (31) and an antenna therefor (30) are provided.

The communication module is a communication device for connecting with an external network such as a 3G mobile telephone circuit network, PHS, wireless LAN or Bluetooth (registered trademark) and is provided in various forms including CF cards or PCI cards.

Furthermore a known software modem technique for adapting to a plurality of types of wireless networks may be mounted in the CPU (10) and may make common use of the hardware.

Figure 2:
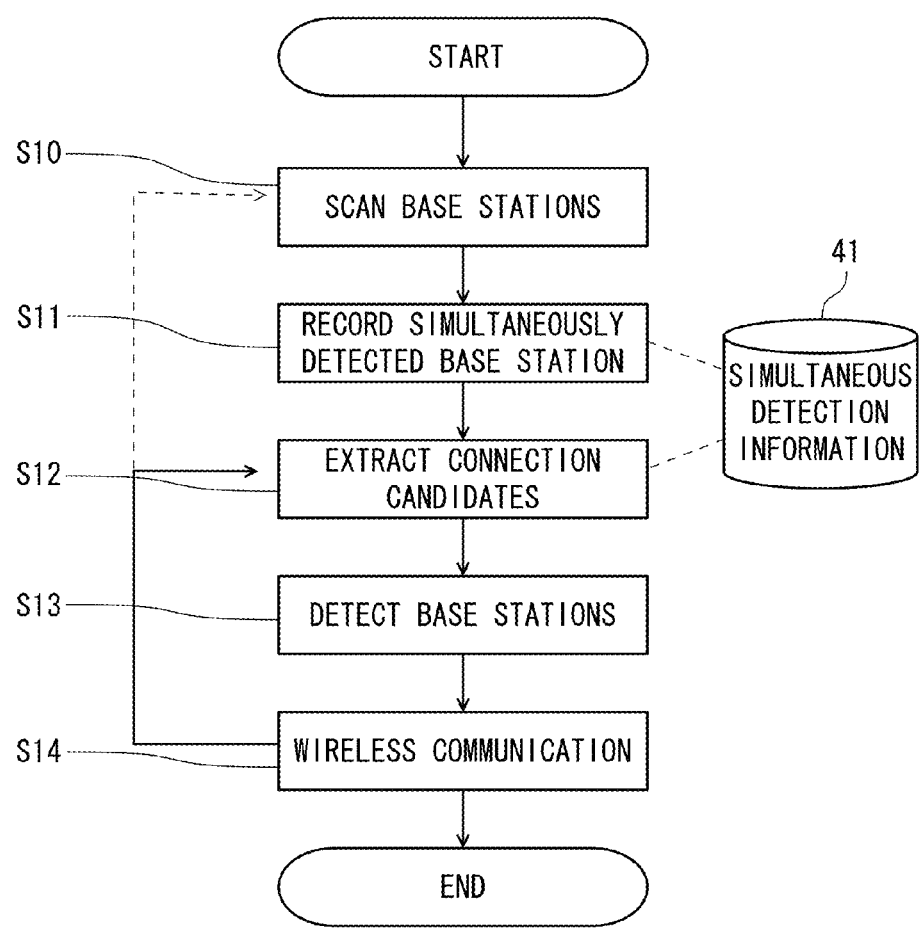
FIG. 2 is a flowchart showing the processing operations of the present invention.

As shown in the flowchart in FIG. 2, firstly a base station scanning unit (100) scans base stations using a communication module A(21) and a communication module B(31). The method of scanning may be a method determined for each wireless communication network. For example, when using a wireless LAN, communication capability can be checked by scanning wireless frequencies for 14 channels prescribed by IEEE 802.11g or 4 channels prescribed by IEEE 802.11a. When using a mobile telephone or PHS, simple detection of whether a communication is possible or not is sufficient. (Base station scanning step: S10).

Figure 4:
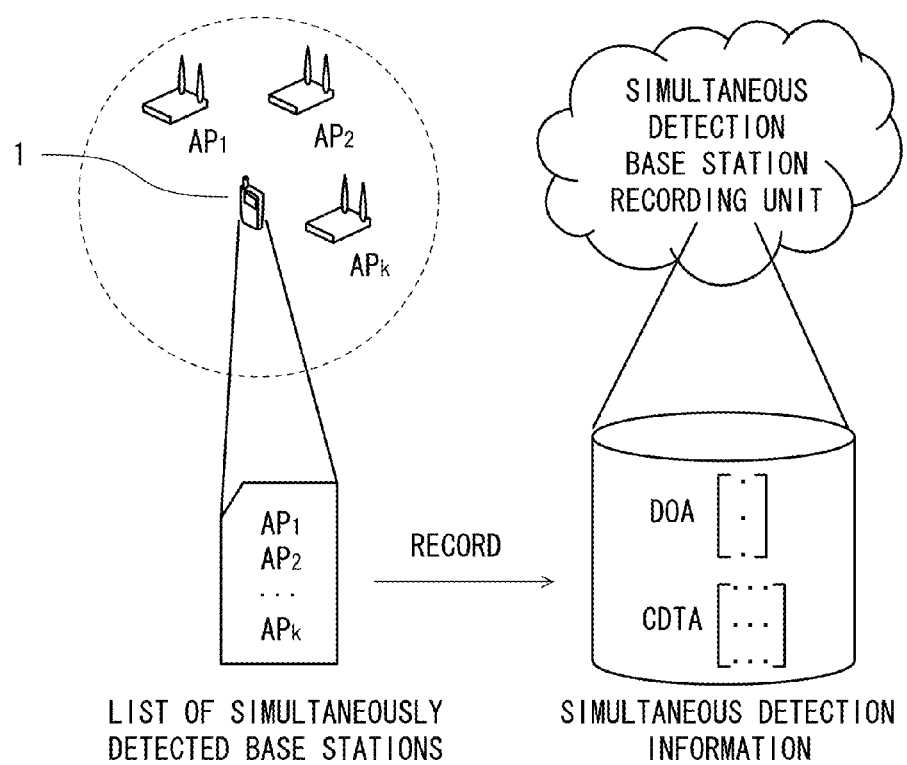
FIG. 4 describes the recording process for simultaneous detection information.

Information regarding simultaneously detected base stations at a given point in time is recorded by a simultaneous detection base station recording unit (101) as simultaneous detection information (41) in an external storage device (40). As shown in FIG. 4, in response to the scanning results, a list of base stations is produced when the wireless communication terminal (1) detects a plurality of base stations (AP1 . . . APk). The recording of this information is the simplest configuration of the present invention. The base station information is preferably a unique identification number for a base station, for example an MAC address for an Ethernet (registered trademark) or an ESSID assigned to the base station. At the same time, it is preferred that the frequency channel used by the base stations is also recorded. (Simultaneous base station recording step: S11).

By repeating the processes up until this point, a large amount of simultaneous detection information (41) is accumulated. The present invention is based on the accumulated information to rapidly select the connection candidate base station for subsequent connection.

In other words, the connection candidate extraction unit (102) reference the simultaneous detection information (41), searches the list containing the currently connected base stations and extracts simultaneously detected base stations from that list. From the example shown in FIG. 4, when AP1 is currently connected, AP2 . . . . APk are extracted. (Connection candidate extraction step: S12).

Although all the base stations may be extracted as connection candidate base stations and connection attempted from the list by the wireless communication processing unit (103), preferred base stations may be selected. The method of selection is most preferably a method based on a simultaneous detection probability discussed hereafter. However arbitrary use is also possible of a method of selecting a base station with the highest frequency of simultaneous detection, a method of selecting a base station to the greatest degree possible in the same network as the wireless communication network currently used for communication, a method of selecting as much as possible a base station with channels having a different frequency in order to avoid cross talk, a method of selecting a base station with low communication traffic from other terminals, or a method of selecting a base station with low peripheral radio-wave interference.

Wireless communication (S14) with an extracted base station is performed. Normally, applications such as mail client software or a web browser are executed by an application execution and processing unit (104). Consequently the base station for subsequent connection is constantly identified and smooth switching of connection destinations is enabled by repeating the extraction process (S12) for connection candidates by the connection candidate extraction unit (102).

The above configuration of the present invention avoids the conventional requirement for determining a connection destination after scanning all frequency channels, searching base stations and comparing with the reception signal intensity (RSSI value) and therefore enables rapid determination of a connection destination. In this manner, communication discontinuity even during handover is avoided and it is possible to continue high-quality communication.

Furthermore power consumption for scanning different wireless communication networks or scanning frequency channels can be reduced thereby realizing an energy-efficient wireless communication terminal.

When the wireless communication processing unit (103) cannot connect with a base station extracted in the connection candidate extraction step (S12), reception signal intensity detection (RSSI) may be performed by a base station scanning unit (100) and connection performed with the base station having the strongest signal intensity.

A base station detection unit (105) may be provided in the CPU (10) of the wireless communication terminal (1). In the same manner as the base station scanning unit (100) above, the base station detection unit (105) is provided with the function of detecting how many frequency channels can be used or whether the terminal is within communication range of a 3G mobile telephone network. (Base station detection step: S13).

However in contrast to the base station scanning unit (100), scanning is performed only with respect to channels of base stations extracted as connection candidate base stations. In other words, the base station scanning unit (100), for example, scans 14 frequency channels from 1 to 14 in sequence whereas the base station detection unit (105) merely detects whether or not a wireless communication network or frequency channel used in a connection candidate base station can be used.

In the present embodiment, although the base station detection unit (105) and the base station scanning unit (100) are shown separately to facilitate description, generally reception signal intensity is information which can be acquired by a CPU (10) from a communication module (21), (31) and therefore hardware can be shared.

According to the above configuration, rather than direct connection with a connection candidate, base station detection enables detection of whether or not a signal intensity enabling communication can be obtained or whether or not a terminal is within range of a wireless communication network and therefore unnecessary attempts for connection are avoided.

Furthermore a base station with the strongest reception signal intensity can be selected from the connection candidate base stations.

Next the optimal configuration for processing in the connection candidate extraction unit (102) will be described.

A probability that a base station will be simultaneously detected is used when extracting a connection candidate or in order to determine the relative merits of extracted connection candidates. For example, when AP1 has been detected 100 times, the use of a probability expressing how many times AP2 has been detected at the same time as AP1 enables base stations with higher probabilities to be identified as connection candidates.

Furthermore when the probability is lower than a given threshold value, it is possible to eliminate a base station from the connection candidates.

Figure 3:
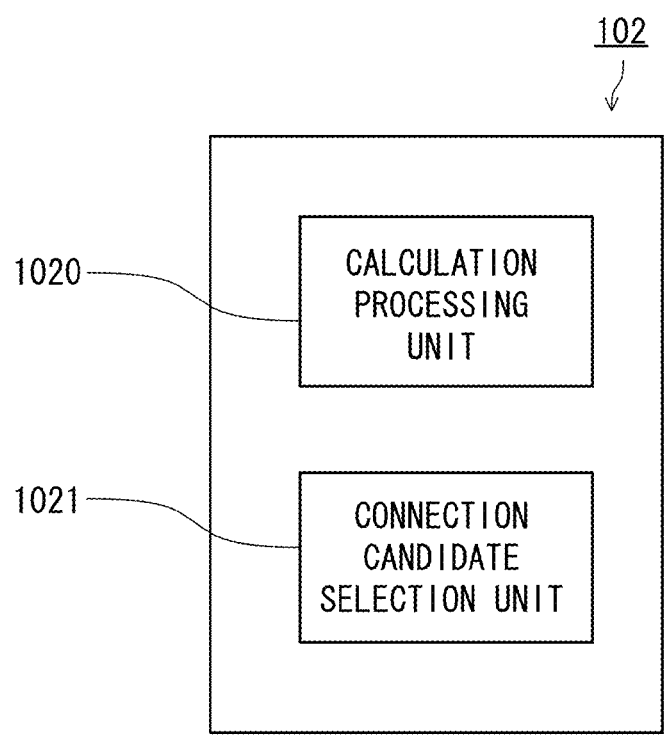
FIG. 3 shows the configuration of a connection candidate extraction unit.

FIG. 3 shows the detailed configuration of the connection candidate extraction unit (102). The processes performed by the CPU (10) may be divided into a calculation processing unit (1020) and a connection candidate selection unit (1021).

Furthermore as shown in FIG. 4, when the simultaneous detection base station recording unit (101) records simultaneous detection information, recording is performed by introducing two matrices DOA (Detection of One AP) and CDTA (Concurrent Detection of Two APs).

DOA is one dimensional information which is a list storing a value for each base station. DOA contains values being the counts of the simultaneous detection results including each base station. DON which is a constituent element of DOA expresses a value for a simultaneous detection result including $AP_i$.

For example, when there are four base stations AP1-AP4, the initial value for DOA is (0, 0, 0, 0). When APE AP2, AP4 are initially simultaneously detected, $DOA_1$, $DOA_2$, $DOA_4$ respectively take values of 1 and DOA is updated to (1, 1, 0, 1). Next, when APE AP4 are detected simultaneously, DOA is updated to (2, 1, 0, 2).

CDTA is two-dimensional information which counts the number of times two base stations are simultaneously detected. $CDTA_{ij}$ are the elements of CDTA and express the number of simultaneous detection results for which the scanning results contain $AP_i$ and $AP_j$ at the same time.

For example, the initial value for CDTA in the example above for AP1-AP4 becomes the following expression.

$$\begin{bmatrix} 0 & 0 & 0 & 0 \\ 0 & 0 & 0 & 0 \\ 0 & 0 & 0 & 0 \\ 0 & 0 & 0 & 0 \end{bmatrix} \quad \text{Expression 1}$$

When APE AP2, AP4 are simultaneously detected, $CDTA_{12}$, $CDTA_{14}$, $CDTA_{21}$, $CDTA_{24}$, $CDTA_{41}$ and $CDTA_{42}$ respectively take a value of 1 and Expression 1 is updated as shown in Expression 2 below.

$$\begin{bmatrix} 0 & 1 & 0 & 1 \\ 1 & 0 & 0 & 1 \\ 0 & 0 & 0 & 0 \\ 1 & 1 & 0 & 0 \end{bmatrix} \quad \text{Expression 2}$$

Then when AP1 and AP4 are simultaneously detected, a value of 1 is added to $CDTA_{14}$ and $CDTA_{41}$ to obtain Expression 3.

$$\begin{bmatrix} 0 & 1 & 0 & 2 \\ 1 & 0 & 0 & 1 \\ 0 & 0 & 0 & 0 \\ 2 & 1 & 0 & 0 \end{bmatrix} \quad \text{Expression 3}$$

As shown above, $CDTA_{ij}$ and $CDTA_{ji}$ have the same value. When the scanning results include k number of base stations, an arbitrary combination of two base stations is expressed as $_kC_2$. The number of such combinations increases the count for the relevant CDTA elements. The DOA count is also increased by k elements.

This series of operations is repeated on each occasion the base station scanning unit (100) acquires simultaneous detection information. When a new base station is included in the scanning results, the matrix size is increased to include the newly identified base station. Since each base-station channel is recorded by assignment to an MAC address, when the MAC address of the base station is given, the base-station frequency channel is given.

The two matrices for simultaneous detection information in the simultaneous detection base station recording unit (101) are updated when scanning all channels or when scanning the wireless communication network.

The calculation processing unit (1020) calculates a base-station simultaneous detection probability $P_{ij}$ based on CDTA and DOA. The simultaneous detection probability is defined as the probability with respect to two arbitrary access points $AP_j$, $AP_j$ that $AP_j$ will be recognized simultaneously with the detection of $AP_j$.

Figure 5:
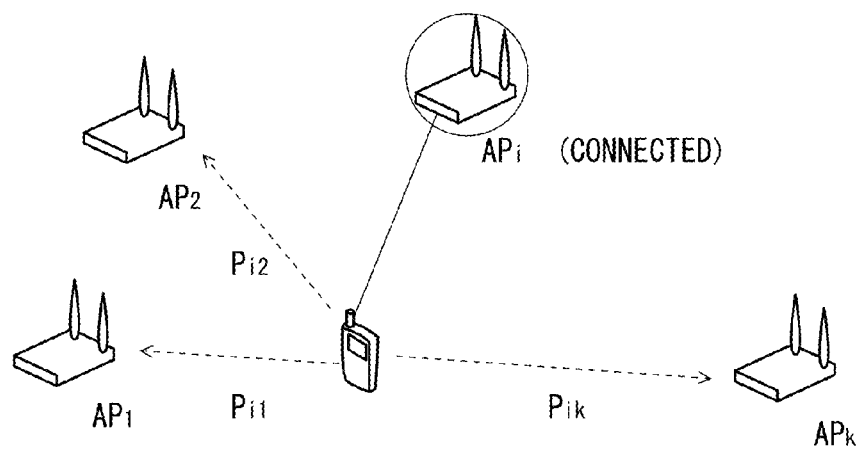
FIG. 5 describes the simultaneous detection probability.

As shown in FIG. 5, when connected to or detecting $AP_j$, the probability of simultaneously detecting $AP_1$, $AP_2$, $AP_k$ is expressed respectively as $P_{i1}$, $P_{i2}$, $P_{ik}$.

The required simultaneous detection probability Pij is defined as the recorded number of simultaneous detection of APi and APj divided by the recorded number of detection of APi as shown in Expression 4 below.

$$Pij = CDTAij/DOAi (i < j) \quad \text{Expression 4}$$
$$= CDTAji/DOAi (i > j)$$
$$= 0 (i = j)$$

Since CDTAij and CDTAji take the same value, when i>j, reference may be made to CDTAji.

For example, if CDTA in Expression 3 is considered, since DOA=(2, 1, 0, 2), $P_{1j}$ may be calculated as follows.

$$P_{11}=0\% \quad \text{Expression 5}$$

Since $CDTA_{12}=1$, $P_{12}=1/2=50\%$
Since $CDTA_{13}=0$, $P_{13}=0/2=0\%$
Since $CDTA_{14}=2$, $P_{14}=2/2=100\%$ FIG. 6 shows an excerpt of results when actually migrating between a plurality of base stations and scanning and accumulating simultaneous detection results which are recorded in DOA or CDTA and used to calculate a simultaneous detection probability. In FIG. 6, although the highest value is 99% and the lowest is 0%, as shown above, a value of 100% is theoretically possible.

The connection candidate selection unit (1021) uses the calculation results from the calculation processing unit (1020) to sort candidate base stations for subsequent connection and performs selection operations as required.

In other words, since a historically high simultaneous detection probability means a high probability of detection on the current occasion, the wireless communication processing unit (103) determines the order of connection attempting or the order of scanning by the base station detection unit (105) in accordance with the simultaneous detection probability.

For example, the calculation results in Expression 5 show that the connection candidate base stations when currently connected to AP1 are in order of AP4 and AP2. AP3 is not a connection candidate as there is no history of simultaneous detection.

The base station detection unit (105) scans only frequency channels for the destination base station AP4 and when that base station is detected, connection with AP4 is performed.

The simultaneous detection probability is defined with respect to a threshold value and a base station which has a value less than the predetermined threshold value may be excluded from the connection candidates even when a history of simultaneous detection is available. For example, since the value for $P_{ij}$ of 5% means that the possibility that $AP_j$ will be detected during connection to $AP_i$ is only 5%, it is determined that scanning all channels by the base station scanning unit (100) as a first step is more effective than attempting to scan $AP_j$.

As a result, the threshold value may be placed at 10% for example in order to exclude base stations associated with smaller values.

However since simultaneous detection of base stations is not limited to the situation in which their areas overlap, it is sometimes the case that a value of nearly 100% will result when one area is broad (for example a mobile telephone network) and the other is narrow (for example, a wireless LAN). However high values will not result when both base stations have substantially the same area and the position of the base stations is different.

Thus if the threshold value is set to a high value, base stations which should be the object of scanning will be excluded which will have the result of reducing connection accuracy.

Experiments conducted by the present inventors have shown that when the number of pieces of simultaneous detection information is approximately 100, accuracy is improved by setting the threshold value to a value of 0 (a threshold value is not set) and when there are more than 1000 pieces of information, the threshold value is preferably set to 20% to 40%.

However in the present invention, the base station scanning unit (100) extracts simultaneous detection information periodically or under predetermined circumstances. However if the frequency of such operations is overly high or the execution processing amount of the application execution processing unit (104) is high, when scanning is performed, the maximum effect according to the present invention will not be obtained.

In this event, the CPU (10) may be provided with a communication state detection unit (106) and a scanning execution command unit (107) to enable detection of a preferred timing for the performance of scanning operations.

The communication state detection unit (106) detects a current communication state in the communication terminal by monitoring the packet amount or usable port numbers in the communication modules (21), (31). Alternatively, the communication state (including the execution processing share of the CPU) can be detected by the application execution processing unit (104) directly acquiring information for currently running applications.

In addition, information regarding the communication state may be acquired from any of the processing mechanisms such as the wireless communication processing unit (103) provided in the wireless communication terminal (1).

The scanning execution command unit (107) commands the base station scanning unit (100) to execute scanning processing in response to the acquired communication state.

More precisely, scanning is executed when communication processing is not performed or not used very much, for example when the packet amount is less than a predetermined amount, when the port number for packet transmission is not a port number used for high-load transmission such as voice communication or image transmission, or when the only applications used do not use a network connection with the application executing processing unit even when connected with a base station.

Functions of identifying applications are generally determined with reference to a port number. A port number may be determined as a well-known port and a list thereof is disclosed in Non Patent Literature 4.

Conditions for performing scanning execution commands may be stored in the external storage device (40) and a combination of such conditions may be used. The CPU (10) may be provided with a timer so that scanning is executed under defined conditions at a predetermined cycle.

Furthermore detection of battery use or connection to commercial power source enables the scanning execution frequency to be increased when commercial power sources are used.

The above configuration enables acquisition of simultaneous detection information by utilizing time free of execution processing for applications or communication. Consequently simultaneous detection information can be accumulated without a large effect on execution of normal communication or applications. In this manner, the operability of the wireless communication terminal (1) is improved, power consumption resulting from unnecessary scanning is reduced and the load on the network can be reduced.

EXAMPLE 2

Recording Three or More Simultaneous Detection Base Stations

In the configuration in Example 1, when two base stations AP1, AP2 are simultaneously detected in the simultaneous detection base station recording unit (101), a value of 1 was added to the term for AP2 in the simultaneous detection information for AP1 and a value of 1 was added to the term for AP1 in the simultaneous detection information for AP2.

Even when three base stations AP1, AP2, AP4 are simultaneously detected, combinations of two base stations are created and a matrix (Expression 2) in which $CDTA_{12}$, $CDTA_{14}$, $CDTA_{21}$, $CDTA_{24}$, $CDTA_{41}$, $CDTA_{42}$ have respective values of 1 is created as described above.

According to this method, when the base station performing current communication is AP1, a simultaneous detection probability is calculated for any single base station when selecting the connection candidate base station for subsequent connection.

Figure 8:
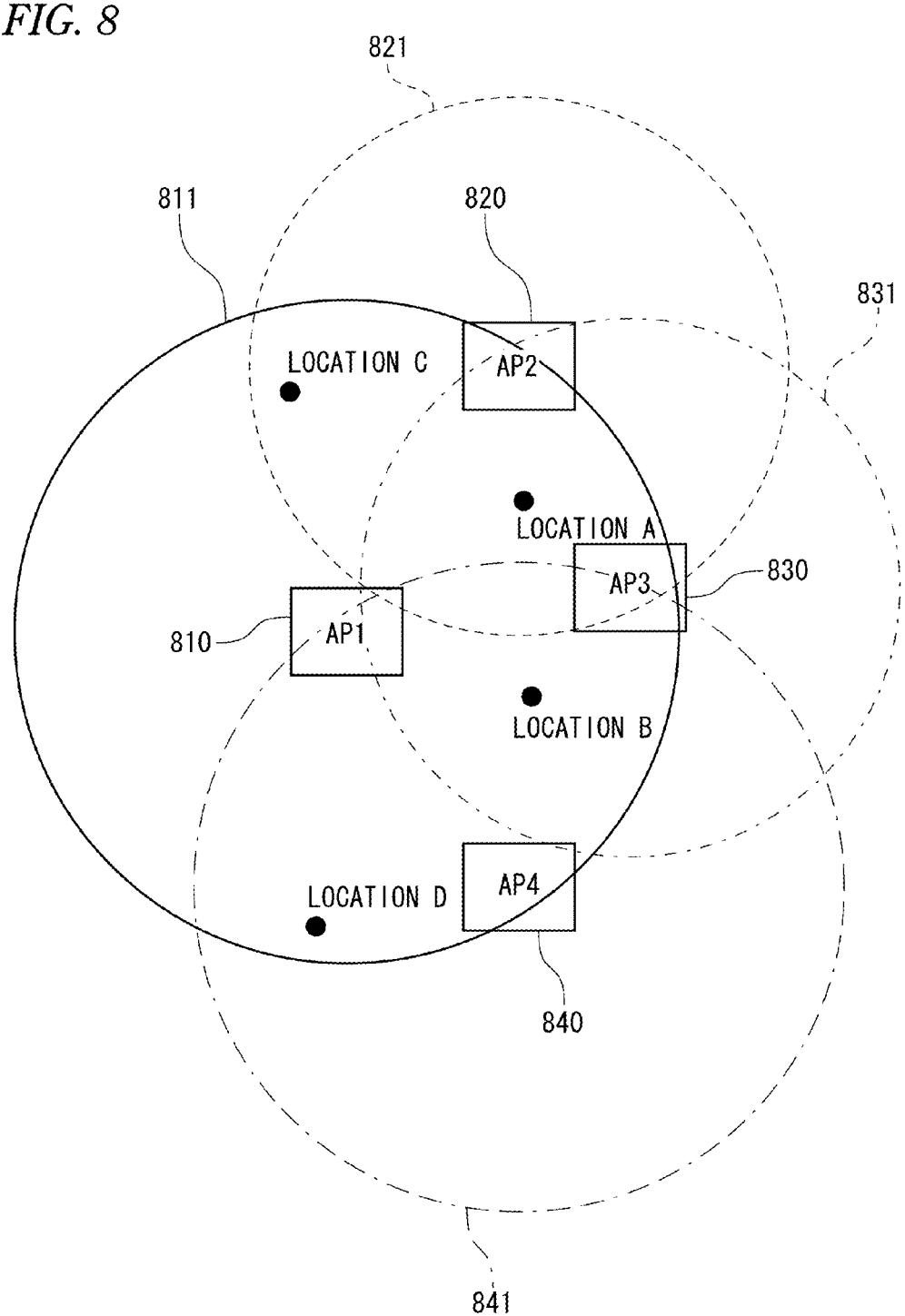
FIG. 8 describes the distribution of communication areas for a plurality of base stations.

However as shown in FIG. 8, when a plurality of base stations AP1-AP4 (810), (820), (830), (840) have respective communication areas (811), (821), (831), (841), the wireless communication terminal (1) will be within the areas (811), (821), (831) of AP1, AP2, AP3 when at position A.

Furthermore the wireless communication terminal (1) will be within the areas (811), (831), (841) of AP1, AP3, AP4 when at position B.

When the currently connected base station is AP1 as in Example 1, and a connection candidate base station is selected with reference to the simultaneous detection probability of AP2, AP3, AP4, since the base station with the highest simultaneous detection frequency is selected, selection of the connection candidate base station itself differs in response to a higher frequency of simultaneous detection information recorded for a given location.

For example, since AP1 and AP2 are simultaneously detected at a location C, AP2 is selected as a connection candidate base station if the accumulated frequency of simultaneous detection information is high. This method uses a simple calculation and although a level of accuracy is realized by using historical results from numerous wireless communication terminals (1) at location C, poor selection may result with respect to a connection candidate base station at a location at which only a low amount of simultaneous detection information has been accumulated.

This problem is avoided by recording simultaneous detection information for a combination of three or more base stations which are simultaneously detected and by using information regarding a currently connected base station or the combination of currently detected base stations when selecting a connection candidate base station.

Firstly when recording simultaneous detection information at a location A, the two-dimensional CDTA, as shown in Expression 2, is expanded to include a multi dimensional CDTA. For example, when recording a combination of a maximum of three base stations, a three-dimensional CDTA may be recorded. Since AP1, AP2, AP3 are detected simultaneously at the location A, when the first matrix expresses a combination of AP1 with other base stations and the second matrix expresses a combination of AP2 with other base stations, Expression 6 is written as follows.

$$\begin{bmatrix} 0 & 0 & 0 & 0 \\ 0 & 0 & 1 & 0 \\ 0 & 1 & 0 & 0 \\ 0 & 0 & 0 & 0 \end{bmatrix} \begin{bmatrix} 0 & 0 & 1 & 0 \\ 0 & 0 & 0 & 0 \\ 1 & 0 & 0 & 0 \\ 0 & 0 & 0 & 0 \end{bmatrix} \begin{bmatrix} 0 & 1 & 0 & 0 \\ 1 & 0 & 0 & 0 \\ 0 & 0 & 0 & 0 \\ 0 & 0 & 0 & 0 \end{bmatrix} \begin{bmatrix} 0 & 0 & 0 & 0 \\ 0 & 0 & 0 & 0 \\ 0 & 0 & 0 & 0 \\ 0 & 0 & 0 & 0 \end{bmatrix} \quad \text{Expression 6}$$

In addition, when simultaneous detection information is recorded at a location B, since APE AP3, AP4 are detected simultaneously, CDTA from Expression 6 undergoes an addition process as shown in Expression 7.

$$\begin{bmatrix} 0 & 0 & 0 & 0 \\ 0 & 0 & 1 & 0 \\ 0 & 1 & 0 & 1 \\ 0 & 0 & 1 & 0 \end{bmatrix} \begin{bmatrix} 0 & 0 & 1 & 0 \\ 0 & 0 & 0 & 0 \\ 1 & 0 & 0 & 0 \\ 0 & 0 & 0 & 0 \end{bmatrix} \begin{bmatrix} 0 & 1 & 0 & 1 \\ 1 & 0 & 0 & 0 \\ 0 & 0 & 0 & 0 \\ 1 & 0 & 0 & 0 \end{bmatrix} \begin{bmatrix} 0 & 0 & 1 & 0 \\ 0 & 0 & 0 & 0 \\ 1 & 0 & 0 & 0 \\ 0 & 0 & 0 & 0 \end{bmatrix} \quad \text{Expression 7}$$

Furthermore when simultaneous detection information is recorded on a subsequent occasion at a location A, CDTA takes the form shown in Expression 8.

$$\begin{bmatrix} 0 & 0 & 0 & 0 \\ 0 & 0 & 2 & 0 \\ 0 & 2 & 0 & 1 \\ 0 & 0 & 1 & 0 \end{bmatrix} \begin{bmatrix} 0 & 0 & 2 & 0 \\ 0 & 0 & 0 & 0 \\ 2 & 0 & 0 & 0 \\ 0 & 0 & 0 & 0 \end{bmatrix} \begin{bmatrix} 0 & 2 & 0 & 1 \\ 2 & 0 & 0 & 0 \\ 0 & 0 & 0 & 0 \\ 1 & 0 & 0 & 0 \end{bmatrix} \begin{bmatrix} 0 & 0 & 1 & 0 \\ 0 & 0 & 0 & 0 \\ 1 & 0 & 0 & 0 \\ 0 & 0 & 0 & 0 \end{bmatrix} \quad \text{Expression 8}$$

In this example, two-dimensional CDTA can be recorded at the same time as shown above. The method is the same as the method described above and at the location A, a value of 1 is added to the elements AP1 and AP2, AP2 and AP3, and AP1 and AP3, and at the location B, a value of 1 is added to the elements AP1 and AP3, AP3 and AP4, and AP4 and AP1. As a result, simultaneous detection information CDTA takes the form shown in Expression 9.

$$\begin{bmatrix} 0 & 1 & 1 & 0 \\ 1 & 0 & 1 & 0 \\ 1 & 1 & 0 & 0 \\ 0 & 0 & 0 & 0 \end{bmatrix} + \begin{bmatrix} 0 & 0 & 1 & 1 \\ 0 & 0 & 0 & 0 \\ 1 & 0 & 0 & 1 \\ 1 & 0 & 1 & 0 \end{bmatrix} = \begin{bmatrix} 0 & 1 & 2 & 1 \\ 1 & 0 & 1 & 0 \\ 2 & 1 & 0 & 1 \\ 1 & 0 & 1 & 0 \end{bmatrix} \quad \text{Expression 9}$$

Since only two base stations are simultaneously detected at location C and location D, three-dimensional CDTA is not added and results are only recorded as two-dimensional simultaneous detection information. As a result, Expression 9 is updated as shown in Expression 10.

$$\begin{bmatrix} 0 & 1 & 2 & 1 \\ 1 & 0 & 1 & 0 \\ 2 & 1 & 0 & 1 \\ 1 & 0 & 1 & 0 \end{bmatrix} + \begin{bmatrix} 0 & 1 & 0 & 0 \\ 1 & 0 & 0 & 0 \\ 0 & 0 & 0 & 0 \\ 0 & 0 & 0 & 0 \end{bmatrix} + \begin{bmatrix} 0 & 0 & 0 & 1 \\ 0 & 0 & 0 & 0 \\ 0 & 0 & 0 & 0 \\ 1 & 0 & 0 & 0 \end{bmatrix} = \begin{bmatrix} 0 & 2 & 2 & 2 \\ 2 & 0 & 1 & 0 \\ 2 & 1 & 0 & 1 \\ 2 & 0 & 1 & 0 \end{bmatrix} \quad \text{Expression 10}$$

As shown above, the addition process executed with respect to each element by the simultaneous detection base station recording unit (40) for CDTA of three-dimensions or more is as shown below.

For example, four-dimensional CDTA is defined as a matrix having respectively 100 variables as shown below.
Int CDTA[100] [100] [100] [100];

In this case, the maximum number of base stations which can be handled is 100 and a system is assumed in which AP1-AP100 are provided.

In this system, when AP1, AP3, AP5, AP7, AP9 are simultaneously identified, each element can be updated using the following simple command.
CDTA[ind(AP1)] [ind(AP3)] [ind(AP5)] [ind(AP7)]+=1;
CDTA[ind(AP1)] [ind(AP3)] [ind(AP5)] [ind(AP9)]+=1;
CDTA[ind(AP1)] [ind(AP3)] [ind(AP7)] [ind(AP9)]+=1;
CDTA[ind(AP1)] [ind(AP5)] [ind(AP7)] [ind(AP9)]+=1;
CDTA[ind(AP3)] [ind(AP5)] [ind(AP7)] [ind(AP9)]+=1;

Herein ind( ) is a function which returns an index number (for example, 1, 3, 5, 7, 9 or the like) for a certain base station from information for the base station (for example a MAC address).

Execution and processing of the above command by the simultaneous detection base station recording unit (40) enables simple updating of simultaneous detection information (41) for even CDTA information of three or more dimensions in the same manner as two dimensional information.

Turning now to the calculation load for updating the simultaneous detection information (41) by scanning on one occasion, for example, even when twenty base stations are found simultaneously, when updated CDTA is limited to two-dimensions, three-dimensions and four-dimensions, sufficient updating is as shown below.

$$20C2+20C3+20C4=190+1140+4845=6175 \quad \text{Expression 11}$$

In the same manner, updating to five-dimensions (Expression 12), six-dimensions (Expression 13), seven-dimensions (Expression 14) is shown below.

$$20C2+20C3+20C4+2005=21679 \quad \text{Expression 12}$$

$$20C2+20C3+20C4+2005+2006=60439 \quad \text{Expression 13}$$

$$20C2+20C3+20C4+2005+2006+2007=137959 \quad \text{Expression 14}$$

When the above results are considered, if the upper limit for the number of combinations recorded as simultaneous detection information is excessively large, the calculation load increases and there is the problem that rapid CDTA updating processing is difficult or the problem that the data amount for stored CDTA becomes extremely large.

Furthermore the number of base stations selected as connection-destination candidates may be one or several (link aggregation techniques are discussed hereafter) and since information for other base stations is used to increase selection accuracy, there is no need to use simultaneous detection information for many base stations.

The number of base stations stored as simultaneous detection information according to the present invention is preferably 2 to 5 (two-dimensional to five-dimensional CDTA) and more preferably in the range of 2 to 4 (two-dimensional to four-dimensional CDTA). This is due to the fact that the number of high-speed processes in a general computer is optimally of the order of 6000 (four-dimensions). Six-dimensions which exceed 60000 requires time for updating simultaneous detection information and requires large storage amounts.

The calculation processing unit (1020) calculates a simultaneous detection probability $P_{ij}$ for a base station based on CDTA and DOA. The simultaneous detection probability when CDTA has three-dimensions is defined as the probability with respect to three arbitrary access points $AP_i$, $AP_j$, $AP_k$ that $AP_k$ will be recognized simultaneously with the detection of $AP_i$ and $AP_j$.

The simultaneous detection probability $P_{ijk}$ calculated as the frequency of simultaneous detection of APi and APj is expressed in the following equation.

$$P_{ijk}=CDTA_{ijk}/DOA_{ij} \quad \text{Expression 15}$$

When calculating these type of high-dimensional values, the base stations are listed in increasing order and the simultaneous detection information is recorded under the condition that i>j>k. Then when calculating the simultaneous detection probability, calculation is also performed with respect to base stations in increasing order.

A calculation example based on the CDTA shown in Expression 8 will now be discussed. In this CDTA, AP1, AP2, AP3 is recorded twice and AP1, AP3, AP4 is recorded once. When AP1 and AP4 are detected simultaneously, the simultaneous detection probability of AP2 and the simultaneous detection probability of AP3 are respectively calculated.

When the frequency of simultaneous detection of AP1 and AP4 is one, the simultaneous detection probability for AP2 at that time is shown by the following equation.

$$CDTA_{124}=0$$

$$DOA_{14}=1$$

$$P_{123}=0/1=0\% \quad \text{Expression 16}$$

The simultaneous detection probability of AP3 is shown by the following equation.

$$CDTA_{134}=1$$

$$DOA_{14}=1$$

$$P_{134}=1/1=100\% \quad \text{Expression 17}$$

The connection candidate extraction unit (102) uses these results to select AP3 which has a high simultaneous detection probability as a connection candidate base station.

When the simultaneous detection probability for AP2 and AP3 is calculated under conditions of detecting AP1 and AP4, if three-dimensional CDTA, $CDTA_{124}$ and $CDTA_{134}$ are not recorded, calculations are performed making reference to two-dimensional CDTA. In other words, all the simultaneous detection probabilities for AP1 and AP2, AP1 and AP3, AP4 and AP2, AP4 and AP3 are calculated, and the calculation proceeds in a manner such as when the sum of P12 and P24 is large, AP2 is selected, and when the sum of P13 and P34 is large, AP3 is selected.

When using simultaneous detection information of three or more dimensions, calculation of the simultaneous detection probability should be attempted from the higher dimension CDTA and when data is not included, calculations may be performed using lower dimension CDTA. In this manner, more highly reliable connection candidate base stations can be selected when a plurality of base stations is detected simultaneously.

This configuration is particularly preferred when combined with link aggregation techniques performing communication by establishing a link simultaneously with two base stations. In other words, the above embodiment described an example of one currently connected base station with other detected base stations which are simultaneously detected. However when using link aggregation techniques, there may be two or more connected base stations.

Link aggregation is a known technique and IEEE 802.3ad which is a representative technique disclosed in Non Patent Literature 5 is a specification which bundles a plurality of physical links and realizes the provision of a virtual broadband link in layer 2.

Figure 9:
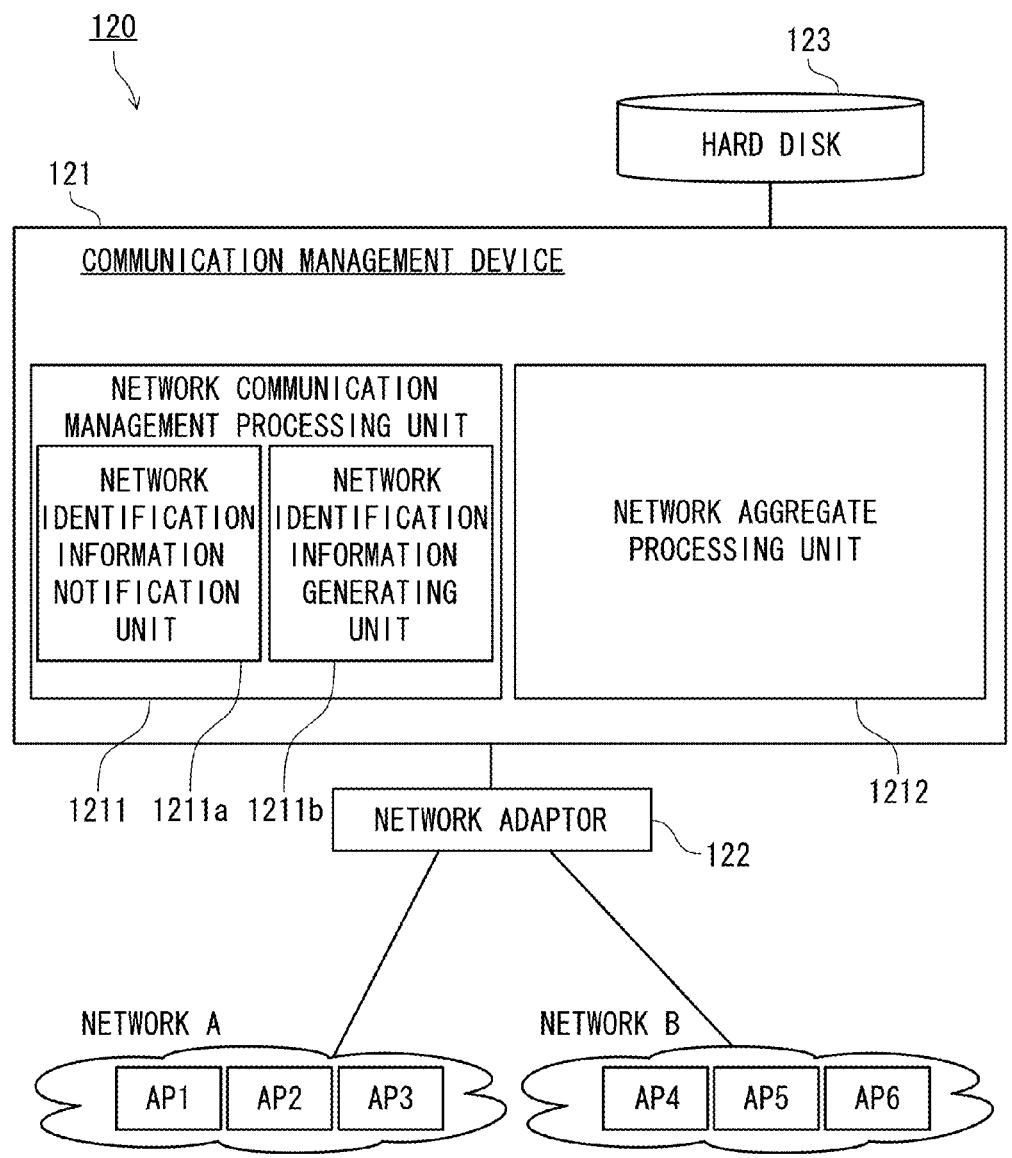
FIG. 9 shows the configuration of a communication management device in a link aggregation system.

It is particularly preferred to combine with the technique disclosed in Non Patent Literature 6 by the present inventors. In this system, a link is formed by autonomously selecting a combination of one or two or more connections from the access points or a plurality of communication networks using the communication management device (120) as shown in FIG. 9 in order to provide a communication network system enabling communication using a communication terminal.

The communication management device (120) on the communication network side manages the communication networks and access points together with communication in the communication network. Unique network identification information for at least either each communication network or each access point is provided to a network identification information generating section (1211*b*) and the communication terminal is notified of this information by the network identification information notification section (1211*a*). The network identification information notification section (1211*a*) and the network identification information generating section (1211*b*) are provided with a network communication management unit (1211) of a CPU (121).

The CPU (121) is provided with a network aggregate unit (1212) performing link aggregation forming a single link by bundling communication routes from a plurality of communication networks or access points.

Figure 10:
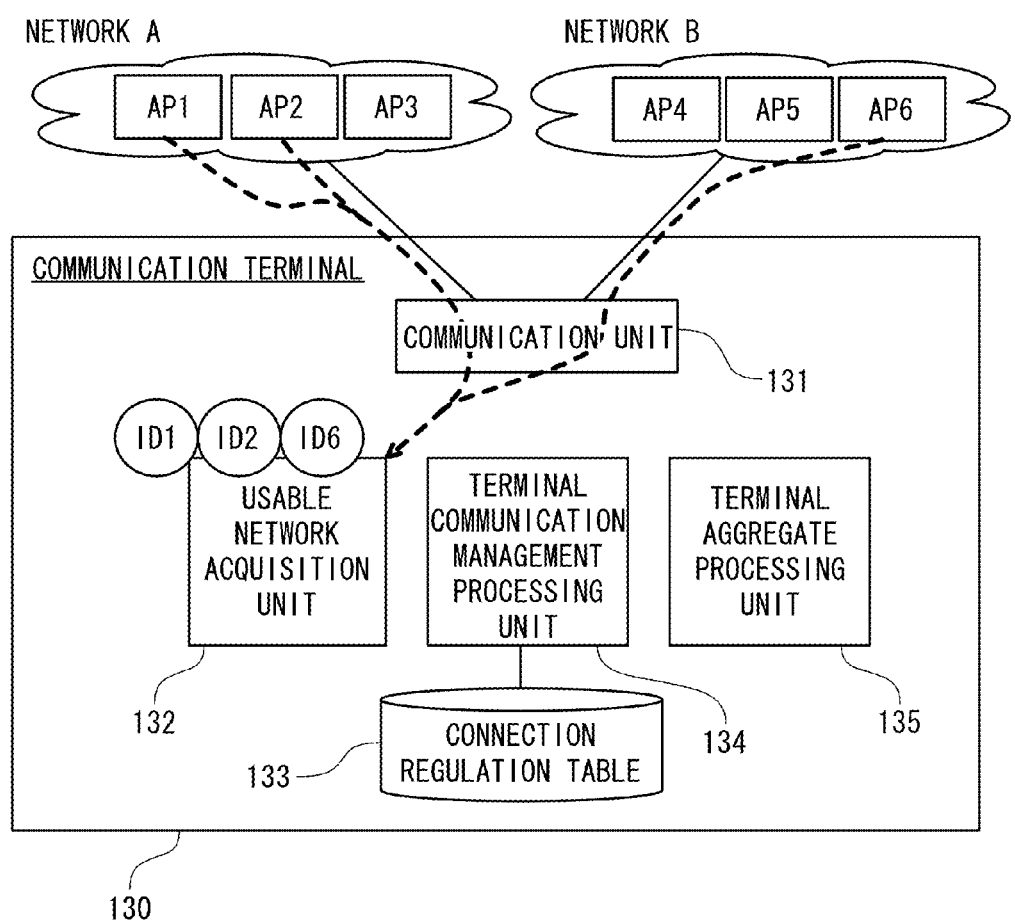
FIG. 10 shows the configuration of a communication terminal in a link aggregation system.

As shown in FIG. 10, the communication terminal (130) in the present system, in addition to a communication unit (131), is provided with a usable network acquisition unit (132) which receives network identification information to acquire usable communication networks or access points, a terminal communication management processing unit (134) selecting access points and the like in accordance with regulations determined by a connection regulation table (133) and a terminal aggregate unit (135) performing link aggregation in cooperation with the network aggregate unit (1212).

According to the present system, a communication network or access point can be automatically identified which enables execution of link aggregation by a communication terminal. Furthermore suitable links can be selected from the wireless links in a plurality of link aggregation formats.

Combination of the technique of the present invention with the present system enables selection of connection candidate base stations enabling link aggregation configuration and imparts high quality communication.

EXAMPLE 3

In Example 1 and 2, simultaneous detection information was described with reference to a process in which each element in CDTA was increased by a value of 1 based on the detection frequency for each base station. This example describes a process of varying an increasing value in response to a communication parameter related to a given base station and not only the use of a frequency.

In this example, a radio-wave intensity of a detected base station (radio field intensity) is used as a communication parameter to vary a value which is incremented in response to the intensity.

A radio-wave intensity is expressed in a range of 0-1 when a predetermined value which is sufficient for communication is given a value of 1 (100%). For example, when AP1 and AP2 are detected simultaneously, if the radio-wave intensity of AP2 is 0.8, a value of 0.8 is added to $CDTA_{12}$. The frequency is counted with respect to $DOA_2$ and incremented by a value of 1.

In wireless communication networks such as wireless LANs which have narrow communication areas, even when in the communication area, communication quality is adversely affected due to weakness of the radio-wave intensity and it is sometimes the case that communication is actually not possible even though detection is achieved. In the configuration according to Example 1, since it is only determined whether or not simultaneous detection is achieved, selection of base stations having poor communication quality as connection candidates will sometimes occur.

However since even when a base station with weak radio-wave intensity is detected, since the simultaneous detection probability is calculated as a low value, there is a tendency to select a base station with high radio-wave intensity.

In Example 1, when AP1 and AP2 are simultaneously detected, a value of 1 was added to both the elements of AP1 and the elements of AP2. However since the radio-wave intensity of AP1 differs from the radio-wave intensity of AP2, in the present example, the added value is not symmetrical. Thus $CDTA_{12}$ and $CDTA_{21}$ must be calculated as different values.

As a result of this calculation, for example, when calculating simultaneous detection probabilities for base stations for wireless communication networks having large differences in radio-wave intensity such as a mobile telephone network or a wireless LAN, the calculation of the simultaneous detection probabilities can take into account asymmetrical features.

The communication parameter can also use reception packet error or communication delay time. Since communication is adversely affected as reception packet error increases or communication delay time lengthens, when these features take large values, the parameter is used so that the simultaneous detection probability takes smaller values.

For example, simultaneous detection information can be configured so that a reception packet error rate which takes a value of 0-1 is subtracted from 1 and that value is used to increment each element of CDTA.

Furthermore the increment may be adapted so that when the communication delay time is greater than or equal to 100 milliseconds, the increment takes a value of 0, when 10-100 milliseconds, it takes a value of 0.5 and when less than or equal to 10 milliseconds, it takes a value of 1.

The communication parameter used in the present invention is arbitrary and the incremental value can be suitably determined according to the characteristics of the parameter. The communication parameter may be acquired during scanning of each base station or a measurement unit for acquiring the communication parameter may be provided to the communication terminal.

The measurement results may be used without modification as a communication parameter or a communication parameter converted based on a regulation or predetermined calculation using the measurement results.

Furthermore this type of communication parameter can be used not only in a direction (positive direction) for adding simultaneous detection information but can also be used in a direction (negative direction) for subtracting and eliminating simultaneous detection information.

For example, when there is a base station for which the communication delay time exceeds 100 milliseconds, a value of 1 may be subtracted from the CDTA elements. Alternatively, a process of deleting simultaneous detection information for that base station can be applied.

The simultaneous detection of a certain base station can be used to execute a process of elimination from the connection candidate base stations. For example, when only AP1, AP2 are simultaneously detected during the calculation of a simultaneous detection probability for AP4, AP4 is designated as a connection candidate base station. Conversely, AP3 is excluded from the connection candidate base stations.

EXAMPLE 4

Figure 11:
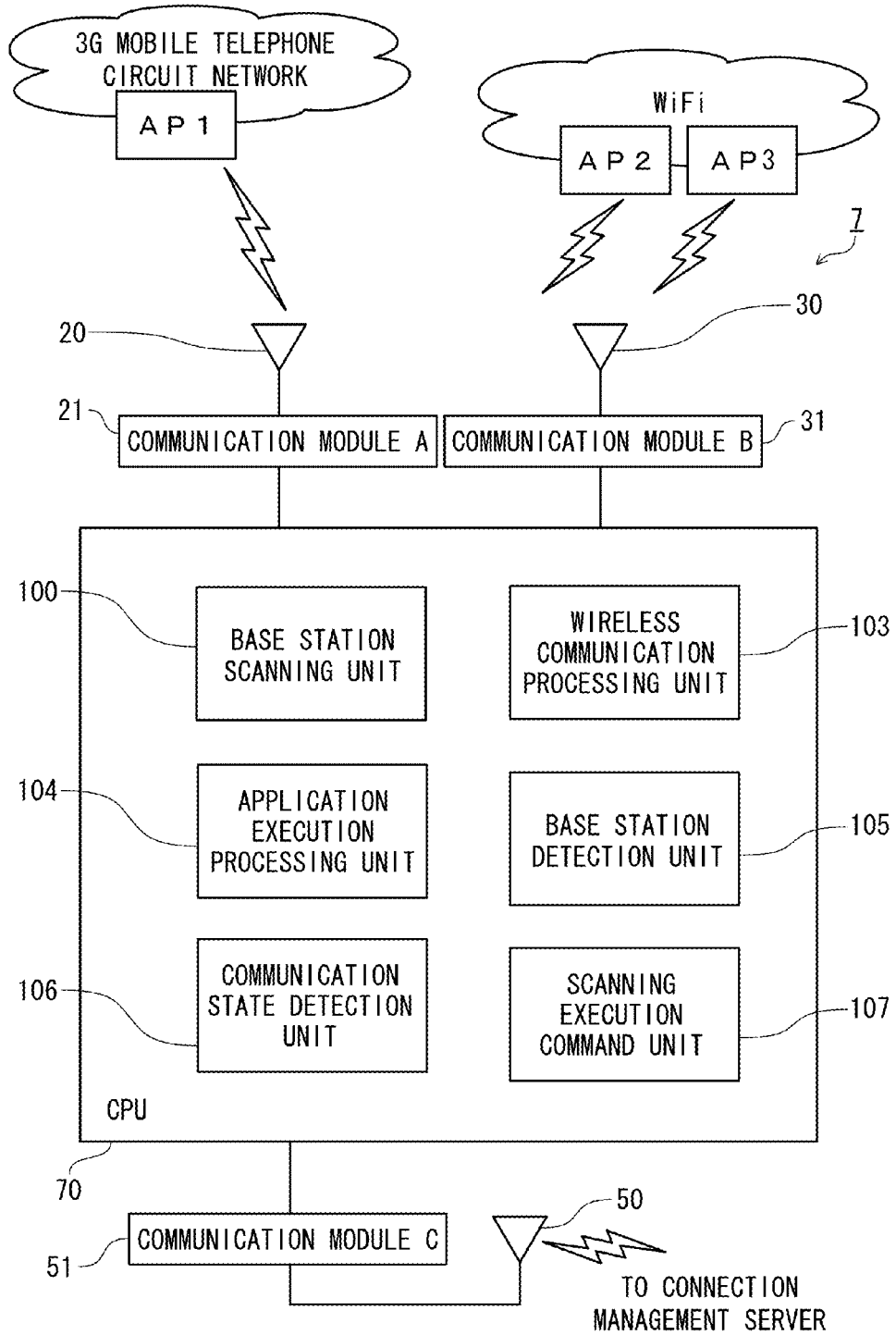
FIG. 11 shows the configuration of a wireless communication terminal in the present invention (Example 4).
Figure 12:
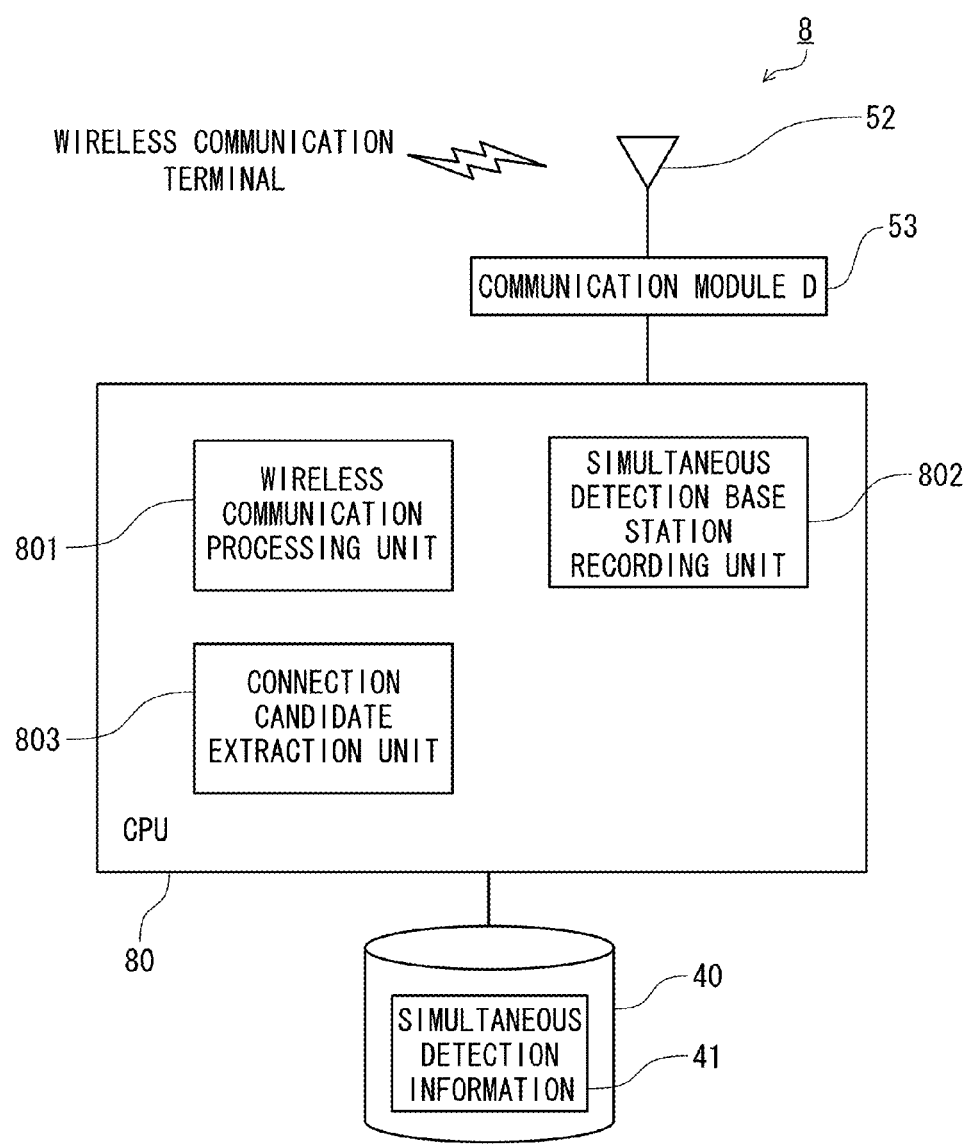
FIG. 12 shows the configuration of a connection management server in the present invention (Example 4).

Example 4 describes a configuration of the wireless communication terminal (7) and the connection management server (8) as shown in FIG. 11 and FIG. 12.

Although connection candidate base stations are obtained with reference to simultaneous detection information (41) in the same manner as the wireless communication terminal (1) in Example 1, the present example is characterized in that a function of recording simultaneous detection information (41) and presenting connection candidate base stations is imparted to the connection management server (8).

More precisely, with reference to the processing units in Example 1, the CPU (70) of the wireless communication terminal (7) is provided with a base station scanning unit (100), a wireless communication processing unit (103) and an application execution processing unit (104) and performs processing operations only using a scanning step (S10) for base stations and a wireless communication step (S14). The first communication unit is configured from the wireless communication processing unit (103) and various communication modules (21), (31), and antennas (20), (30).

The base station detection unit (105) or communication state detection unit (106), and the scanning execution command unit (107) may be provided in the same configuration as the above.

The simultaneous detection information obtained by the base station scanning unit (100) is sent to the connection management server (8). For that reason, the second terminal communication means is configured by the wireless communication processing unit (103), the communication module C (51) and the antenna (50).

In practice, each communication module or antenna can be shared. Particularly, the simultaneous detection information (41) is preferably sent to the connection management server (8) via a currently connected communication network, and via the communication module A if it is currently performing communication. Thus the figure is ultimately merely for the convenience of description and merely divided into constituent elements.

The sent simultaneous detection information is received by the communication module D (53) and the antenna (52) of the connection management server (8) and reaches the CPU (80). The CPU (80) is provided with a wireless communication processing unit (801), a simultaneous detection base station recording unit (802) and a connection candidate extraction unit (803).

The second server communication is configured by a wireless communication processing unit (803), the communication module D (53) and the antenna (52). The wireless communication processing unit (803) stores simultaneous detection information (41) in the external storage device (40).

If the simultaneously detected base stations are simply assembled, the simultaneous detection information (41) does not require any processing and may be directly stored from the wireless communication processing unit (801) but when the information undergoes processing such as DOA or CDTA as in the examples above, the simultaneous detection base station recording unit (802) is provided in the same manner as above, and simultaneous detection information (41) can be recorded. The connection candidate extraction unit (803) operates in the same manner as the unit (102) above.

Extracted connection candidate base stations are sent again from the wireless communication processing unit (801) through the communication module D (53) and the antenna (52) to the wireless communication processing unit (103) of the wireless communication terminal (7) to establish the subsequent wireless communication. Alternatively, scanning may be performed by the base station detection unit (105). These processes are the same as those described in Example 1 above.

According to the configuration of this example, simultaneous detection information (41) can be accumulated using a plurality of wireless communication terminals (7) and therefore simultaneous detection information collected by other terminal can be used. As a result, the extraction accuracy for connection candidates is improved.

Furthermore, there is no need to provide external recording device for recording simultaneous detection information or other processing units to the wireless communication terminal (7), thus contributes to downsizing of the device.

The configuration of this example can be realized by the configuration of Example 2 wherein CDTA having three-dimensions or more is used as simultaneous detection information, by the configuration of Example 3 wherein a communication parameter is used to increment CDTA elements or a configuration using negative information.

EXAMPLE 5

In the wireless communication system used in Example 4, the wireless communication terminal (7) can receive indication of the connection candidate base station as a subsequent connection destination from the connection management server (8). At the same time, the terminal can operate as a terminal for accumulating simultaneous detection information.

Figure 13:
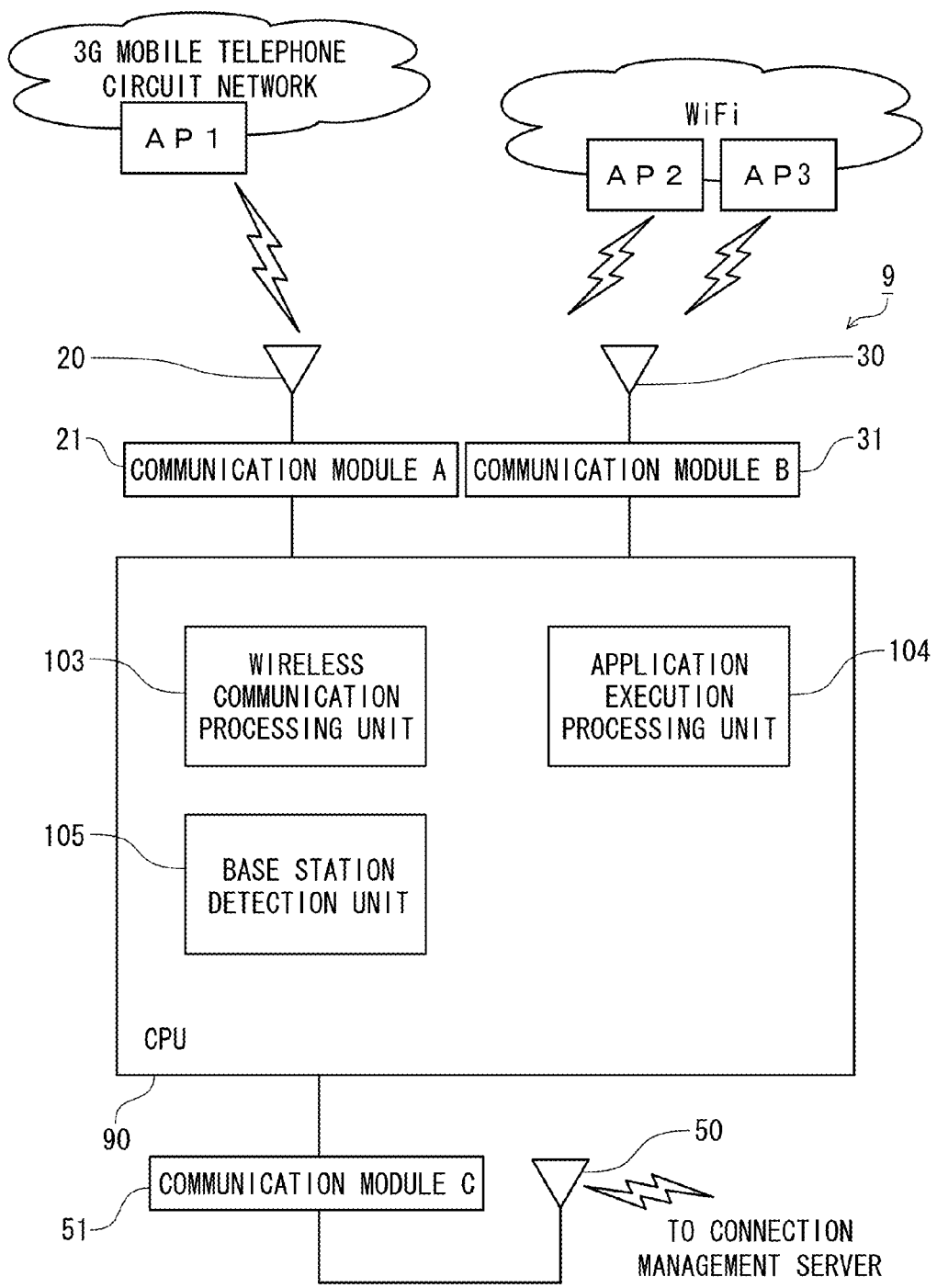
FIG. 13 shows the configuration of a wireless communication designated terminal in the present invention (Example 5).

In Example 5, as shown in FIG. 13, a wireless communication designated terminal (9) is proposed which performs communication operations using only information regarding connection candidate base stations.

The CPU (90) of the terminal (9) is provided with a wireless communication processing unit (103), an application execution processing unit (104) and a base station detection unit (105).

The wireless communication processing unit (103) receives information for the connection candidate base station from the connection management server (8) and performs wireless communication processing (S14). The base station detection unit (105) may perform scanning of indicated connection candidate base stations as required.

This type of wireless communication designated terminal (9) is particularly significant in the context of wireless communication systems which already store large amount of simultaneous detection information or wireless communication system having a large number of wireless communication terminals (7) or scanning designated terminals as discussed below.

In other words, even when base station scanning processing (S10) is not performed in the local terminal, since highly accurate detection of connection destinations is enabled, the size and energy consumption of that terminal (9) can be reduced.

EXAMPLE 6

Figure 14:
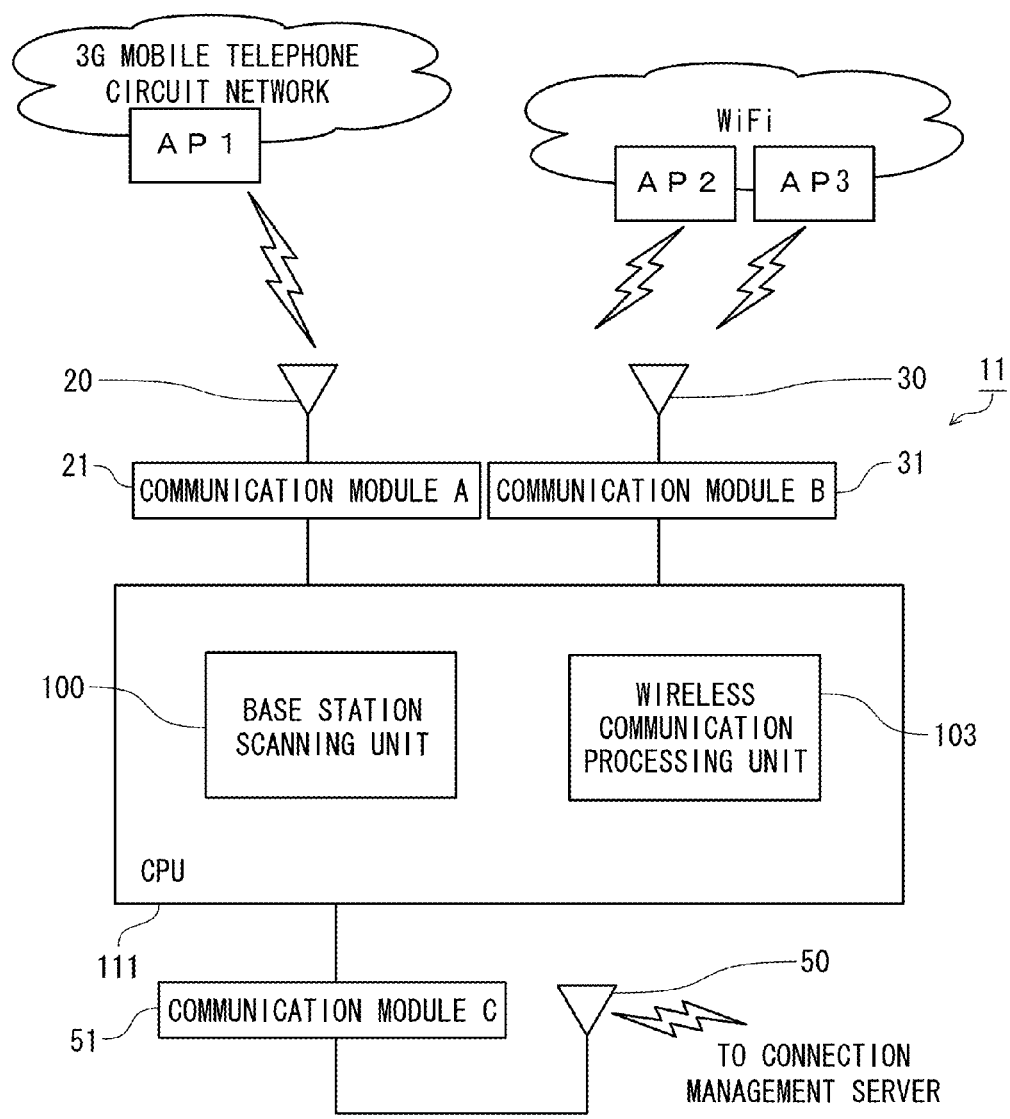
FIG. 14 shows the configuration of a scanning designated terminal in the present invention (Example 6).

FIG. 14 shows a configuration of a scanning designated terminal. The scanning designated terminal (11) is a terminal with the sole purpose of acquiring simultaneous detection information in contrast to the wireless communication terminal (9) in Example 5. A CPU (111) of the terminal (11) is provided with only a base station scanning unit (100) and a wireless communication processing unit (103) and simultaneous detection information acquired by the communication modules (21) (31) is sent from the wireless communication processing unit (103) through the communication module D (51) to the connection management server (8).

The terminal (11) may have the designated application of accumulating information so that the wireless communication terminal (1), (7) or the wireless communication designated terminal (9) can use the present invention after suitable disposition of base stations in a large-scale area. In particular, the detection of whether a frequency channel of a wireless LAN can be received can be performed in an extremely simple manner by a known wireless LAN module and thus the terminal (11) can be downsized and manufactured at a lower cost.

Thus highly accurate detection of connection destinations is enabled by accumulating simultaneous detection information using a large number of terminals (11).

Reference Signs List
1 Wireless Communication Terminal
10 CPU
100 BASE STATION SCANNING UNIT
101 SIMULTANEOUS DETECTION BASE STATION RECORDING UNIT
102 CONNECTION CANDIDATE EXTRACTION UNIT
103 WIRELESS COMMUNICATION PROCESSING UNIT
104 APPLICATION EXECUTION PROCESSING UNIT
105 BASE STATION DETECTION UNIT
106 COMMUNICATION STATE DETECTION UNIT
107 SCANNING EXECUTION COMMAND UNIT
20 ANTENNA
21 COMMUNICATION MODULE A
30 ANTENNA
31 COMMUNICATION MODULE B
40 EXTERNAL RECORDING DEVICE
41 SIMULTANEOUS DETECTION INFORMATION Citation List
Patent Literature
1. Japanese Patent Application Laid-Open No. 2008-148136
Non Patent Literature
1. G Wu, P. Having a and M. Mizuno, "MIRAI Architecture for Heterogeneous Networks," IEEE Comm Mag., pp. 126-134, 2002.
2. M. Inoue, K. Mahmud, H. Murakami, M. Hasegawa and H. Morikawa, "Novel Out-of-Band Signaling for Seamless Interworking between Heterogeneous Networks," IEEE Wireless Commun, Vol. 11, No. 2, pp. 56-63, 2004
3. H. Harada, "Software redefined radio prototype toward Cognitive Radio Communication Systems," IEEE Dyspan 2005, Vol. 1, pp. 539-547, 2005
4. Homepage http://www.iana.org/assignments/port-numbers
5. "Amendment to Carrier Sense Multiple Access with Collision Detection (CSMA/CD) Access Method and Physical Layer Specification—Aggregation of Multiple Link Segments", IEEE 802.3ad 2000.
6. Kentaro Ishizu, Hiroshi Harada, Shuzo Kato, "An Examination of Methods Coordinating Link Aggregation Techniques with Heterogeneous Layers in Cognitive Wireless Clouds" (Kogunitibu Musenkuraudo ni oite Reiya ga Kotonaru Rinku Agurigeeshon Gijutsu o Kyouchou saseru Shuho no Kento) IEICE Technical Report, Vol. 107, No. 314, The Institute of Electronics, Information and Communication Engineers, Nov. 8, 2007

The invention claimed is:

1. A wireless communication terminal enabling connection with a plurality of base stations disposed in different positions, the wireless communication terminal comprising:
a base station scanning unit scanning and detecting a base station capable of communication at a current position of the wireless communication terminal,
a simultaneous detection base station recording unit recording a simultaneously detected base station as simultaneous detection information in a storage unit,
a connection candidate extraction unit wherein the simultaneous detection information forms a basis for extraction of a connection candidate base station which can be detected simultaneously with a connected base station which is currently connected, and
a first communication unit performing communication by connection with the extracted connection candidate base station,
wherein the connection candidate extraction unit includes:
a calculation processing unit which calculates a probability that the connected base station or a detected base station will be simultaneously detected based on the simultaneous detection information, the probability calculated as a simultaneous detection probability for each connection candidate base station,
a connection candidate selection unit selecting a connection candidate base station for which the simultaneous detection probability satisfies a predetermined condition, and
the first communication unit performs communication by connection with the selected connection candidate base station, and
wherein the simultaneous detection probability is a value calculated from the simultaneous detection information by tallying a frequency of simultaneous detection of the connected or detected base station and the connection candidate base station, and dividing this by the detection frequency for the connected base station or the detected base station.

2. The wireless communication terminal according to claim 1, wherein the simultaneous detection base station recording unit records three or more simultaneously detected base stations as simultaneous detection information, and the connection candidate extraction unit extracts connection candidate base stations using simultaneous detection information, said connection candidate base stations being simultaneously detectable base stations which are at least either connected base stations that are currently connected or detected base stations that are currently detected.

3. The wireless communication terminal according to claim 1, further comprising a base station detection unit performing detection only of connection candidate base stations, and the first communication unit performs communication by connection with the connection candidate base stations detected by the base station detection unit.

4. The wireless communication terminal according to claim 1, wherein the simultaneous detection base station recording unit records simultaneous detection information including simultaneously detected base stations together with not only positive information for extraction as a connection candidate base station when the base station is detected, but also negative information for exclusion as a connection candidate base station.

5. The wireless communication terminal according to claim 1, further comprising;
a communication condition detection unit detecting a communication condition in the first communication unit, and
a scanning execution command unit which, in response to detection results, commands the base station scanning unit to scan for a base station capable of communication when communication conditions satisfy predetermined conditions.

6. A wireless communication terminal enabling connection with a plurality of base stations disposed in different positions, the wireless communication terminal comprising:
a base station scanning unit scanning and detecting a base station capable of communication at a current position of the wireless communication terminal,
a simultaneous detection base station recording unit recording a simultaneously detected base station as simultaneous detection information in a storage unit,
a connection candidate extraction unit wherein the simultaneous detection information forms a basis for extraction of a base station which can be detected simultaneously with a connected base station which is currently connected, and
a first communication unit performing communication by connection with the extracted connection candidate base station,
wherein the simultaneous detection base station recording unit is configured to record simultaneous detection information including a predetermined communication parameter value related to a base station together with the simultaneously detected base station, and
the wireless communication terminal includes:
a calculation processing unit calculating a probability of detecting a connection candidate base station simultaneously with a connected base station or a detected base station, the probability calculated as a simultaneous detection probability by a predetermined calculation using the predetermined communication parameter value, and
a connection candidate selection unit selecting a connection candidate base station for which the simultaneous detection probability satisfies a predetermined condition, and
the first communication unit performs communication by connection with the selected connection candidate base station,
wherein a radio-wave intensity with each base station is used as the predetermined communication parameter value, the radio-wave intensity of each simultaneously detected base station is accumulated in the simultaneous detection information, and the simultaneous detection probability is a value calculated by dividing a cumulative value for the simultaneous detection of the connected base station or the detected base station, together with the connection candidate base station, by the detection frequency for the connected base station or the detected base station.

7. A wireless communication system comprising a wireless communication terminal enabling connection with a plurality of base stations disposed in different positions and a connection management server presenting a connection candidate base station for connection after the currently connected base station to the wireless communication terminal, wherein the wireless communication terminal comprises:
a wireless communication terminal enabling connection with a plurality of base stations disposed in different positions, the wireless communication terminal including:
a base station scanning unit scanning and detecting a base station capable of communication at a current position of the wireless communication terminal,
a simultaneous detection base station recording unit recording a simultaneously detected base station as simultaneous detection information in a storage unit,
a connection candidate extraction unit wherein the simultaneous detection information forms a basis for extraction of a base station which can be detected simultaneously with a connected base station which is currently connected, and
a first communication unit performing communication by connection with the extracted connection candidate base station; and
the connection management server includes:
a second server communication unit receiving the simultaneous detection information sent from the wireless communication terminal and sending information regarding a connection candidate base station to the wireless communication terminal,
a storage unit recording the simultaneous detection information, and
a connection candidate extraction unit extracts a connection candidate base station based on the simultaneous detection information, the base station being simultaneously detectable with connected base stations which are currently connected.

8. A wireless communication system according to claim 7, wherein a second terminal communication unit sends at least three simultaneously detected base stations as the simultaneous detection information, and
the connection candidate extraction unit extracts connection candidate base stations on the basis of simultaneous detection information, the connection candidate base stations being simultaneously detectable base stations which are at least either connected base stations that are currently connected or detected base stations that are currently detected.

9. The wireless communication system according to claim 7, wherein the wireless communication terminal comprises a base station detection unit performing detection only of connection candidate base stations, and the first communication unit performs communication by connection with a connection candidate base station detected by the base station detection unit.

10. The wireless communication system according to claim 7, wherein the connection candidate extraction unit in the connection management server comprises:
   a calculation processing unit calculating, on the basis of the simultaneous detection information, a probability that the connected base station or a detected base station will be simultaneously detected, the probability calculated as a simultaneous detection probability for each connection candidate base station, and
   a connection candidate selection unit selecting a connection candidate base station for which the simultaneous detection probability satisfies predetermined conditions, and
   the second server communication unit sends a selected connection candidate base station to the wireless communication terminal.

11. The wireless communication system according to claim 10, wherein the simultaneous detection probability is a value calculated from the simultaneous detection information, tallying a frequency of simultaneous detection of the connected or detected base station with the connection candidate base station, and then dividing that frequency by the detection frequency for the connected base station or the detected base station.

12. The wireless communication system according to claim 7, wherein a second terminal communication unit sends simultaneous detection information including a predetermined communication parameter value related to a base station together with the simultaneously detected base station, and
   the wireless communication system comprises:
   a calculation processing unit calculating a probability of simultaneously detecting the connection candidate base station simultaneously with a connected base station or a detected base station, the probability calculated as a simultaneous detection probability by a predetermined calculation using the predetermined communication parameter value, and
   a connection candidate selection unit selecting a connection candidate base station for which the simultaneous detection probability satisfies a predetermined condition, and
   the first communication unit performs communication by connection with the selected connection candidate base station.

13. The wireless communication system according to claim 12, wherein a radio-wave intensity with each base station is used as the predetermined communication parameter value, the radio-wave intensity of each simultaneously detected base station is accumulated in the simultaneous detection information, and the simultaneous detection probability is a value calculated by dividing a cumulative value for the simultaneous detection of the connected base station or the detected base station and connection candidate base station by the detection frequency for the connected base station or the detected base station.

14. The wireless communication system according to claim 7, wherein simultaneous detection information from a second terminal communication means is recorded, the simultaneous detection information including a plurality of simultaneously detected base stations together with not only positive information enabling extraction of the base station as a connection candidate base station at the point of detection, but also negative information for exclusion as a connection candidate base station.

15. The wireless communication system according to claim 7, wherein the wireless communication terminal further comprises:
   a communication condition detection unit detecting a communication condition in the first communication unit, and
   a scanning execution command unit which, in response to detection results, commands the base station scanning unit to scan for a base station capable of communication when communication conditions satisfy predetermined conditions.

16. A wireless communication designated terminal used in the wireless communication system of claim 7, and comprising;
   a second terminal communication unit receiving information for a connection candidate base station from the connection management server, and
   a first communication unit performing communication by connection with a connection candidate base station.

17. A scanning designated terminal used in the wireless communication system of claim 7, and comprising:
   a base station scanning unit scanning and detecting a base station capable of communication at the current position of the wireless communication terminal, and
   a second terminal communication unit sending simultaneously detected base stations to the connection management server as simultaneous detection information.

* * * * *